United States Patent [19]
Asano et al.

[11] Patent Number: 6,016,982
[45] Date of Patent: Jan. 25, 2000

[54] REEL FOR FISHING WITH INTEGRAL REEL BODY AND GRIP PORTION

[75] Inventors: Shinichi Asano, Chiba; Hiroshi Toma, Tokyo; Nobuyuki Yamaguchi, Tokyo; Toshiro Ono, Tokyo; Masaru Akiba, Saitama; Teiji Matsubara, Chiba; Mitsuru Sasaki, Tokyo, all of Japan

[73] Assignee: Daiwa Seiko, Inc., Tokyo, Japan

[21] Appl. No.: 08/825,022

[22] Filed: Mar. 26, 1997

[30] Foreign Application Priority Data

| Mar. 26, 1996 | [JP] | Japan | 8-070083 |
| Mar. 26, 1996 | [JP] | Japan | 8-070084 |
| Mar. 27, 1996 | [JP] | Japan | 8-072556 |
| Jul. 25, 1996 | [JP] | Japan | 8-196127 |

[51] Int. Cl.[7] .............................................. A01K 89/015
[52] U.S. Cl. .......................... 242/310; 43/23; D22/138; D22/141
[58] Field of Search ................. D22/137, 138, D22/140, 141, 142; 242/310, 316; 43/20, 22, 23

[56] References Cited

U.S. PATENT DOCUMENTS

| D. 135,761 | 6/1943 | Fanshier | 43/20 X |
| D. 145,625 | 9/1946 | Hurd | D22/138 |
| D. 150,951 | 9/1948 | Hill | 43/20 X |
| D. 324,408 | 3/1992 | Kameda | D22/140 |
| D. 351,451 | 10/1994 | Storz | D22/140 |
| D. 366,690 | 1/1996 | Storz | D22/140 |
| D. 377,676 | 1/1997 | Robbins et al. | D22/138 |
| 2,120,069 | 6/1938 | Griswold . | |
| 2,536,288 | 1/1951 | Hurd . | |
| 2,711,045 | 6/1955 | Novack | 43/20 |
| 2,711,046 | 6/1955 | Duplantis | 43/20 |
| 2,752,717 | 7/1956 | Lind | 43/20 |
| 2,783,952 | 3/1957 | Clay | 43/20 X |
| 3,020,665 | 2/1962 | Hull | 43/20 |
| 4,027,419 | 6/1977 | Popeil | 43/18.1 |
| 4,697,376 | 10/1987 | Brackett et al. | 43/18.1 X |
| 4,817,324 | 4/1989 | Brackett et al. | 43/18.1 X |
| 5,050,333 | 9/1991 | Debreczeni | 43/17 |
| 5,444,934 | 8/1995 | LaTouche | 43/18.1 |

FOREIGN PATENT DOCUMENTS

| 49-9789 | 3/1974 | Japan . |
| 1-82765 | 6/1989 | Japan . |

*Primary Examiner*—Donald P. Walsh
*Assistant Examiner*—Emmanuel M. Marcelo
*Attorney, Agent, or Firm*—Liniak, Berenato, Longacre&White

[57] ABSTRACT

A reel for fishing is capable of mounting a fishing rod in its leading end in the direction in which a fishline is played out. The reel for fishing has a reel body which is provided with a spool on which the fishline is wound up, a handle to be driven to rotate the spool in the fishline-winding-up direction, and a grip portion to be held integrally with the reel body at the time of actual fishing. An opening is formed in the reel body, which opening is capable of smoothly thumbing the spool along the direction of the thumb which is gripping and holding the grip portion.

8 Claims, 36 Drawing Sheets

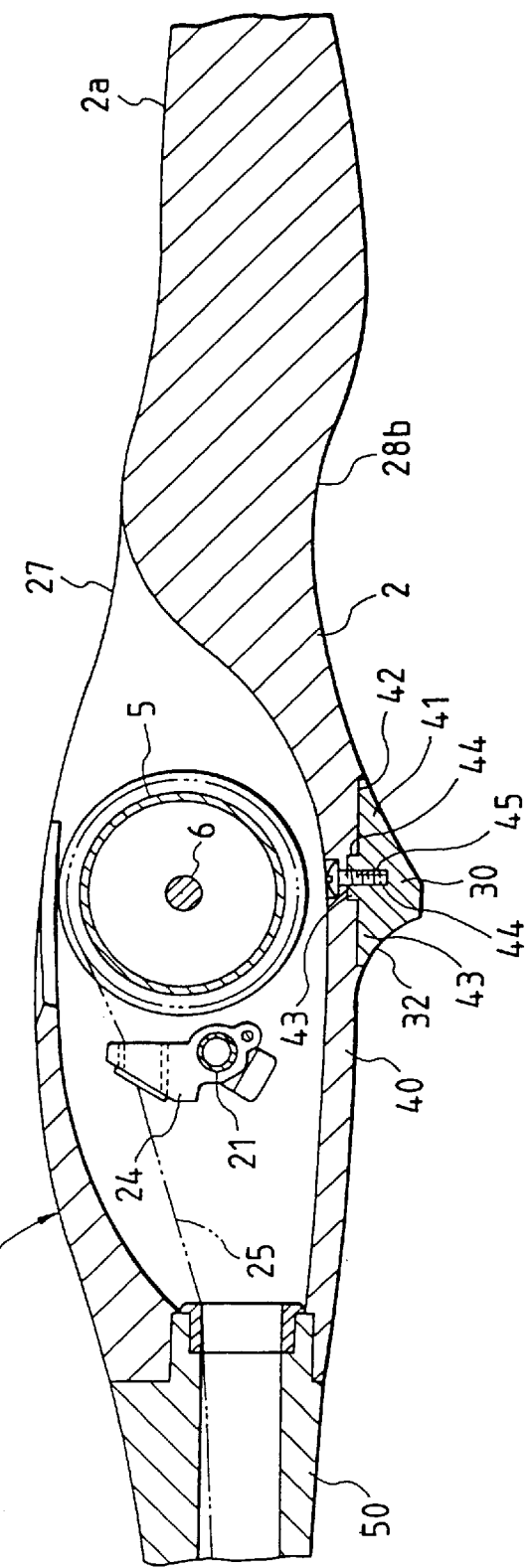
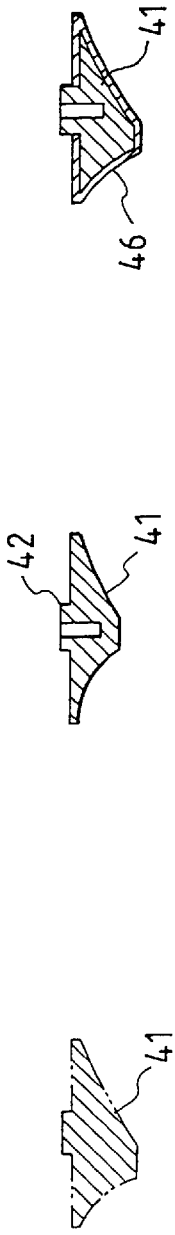

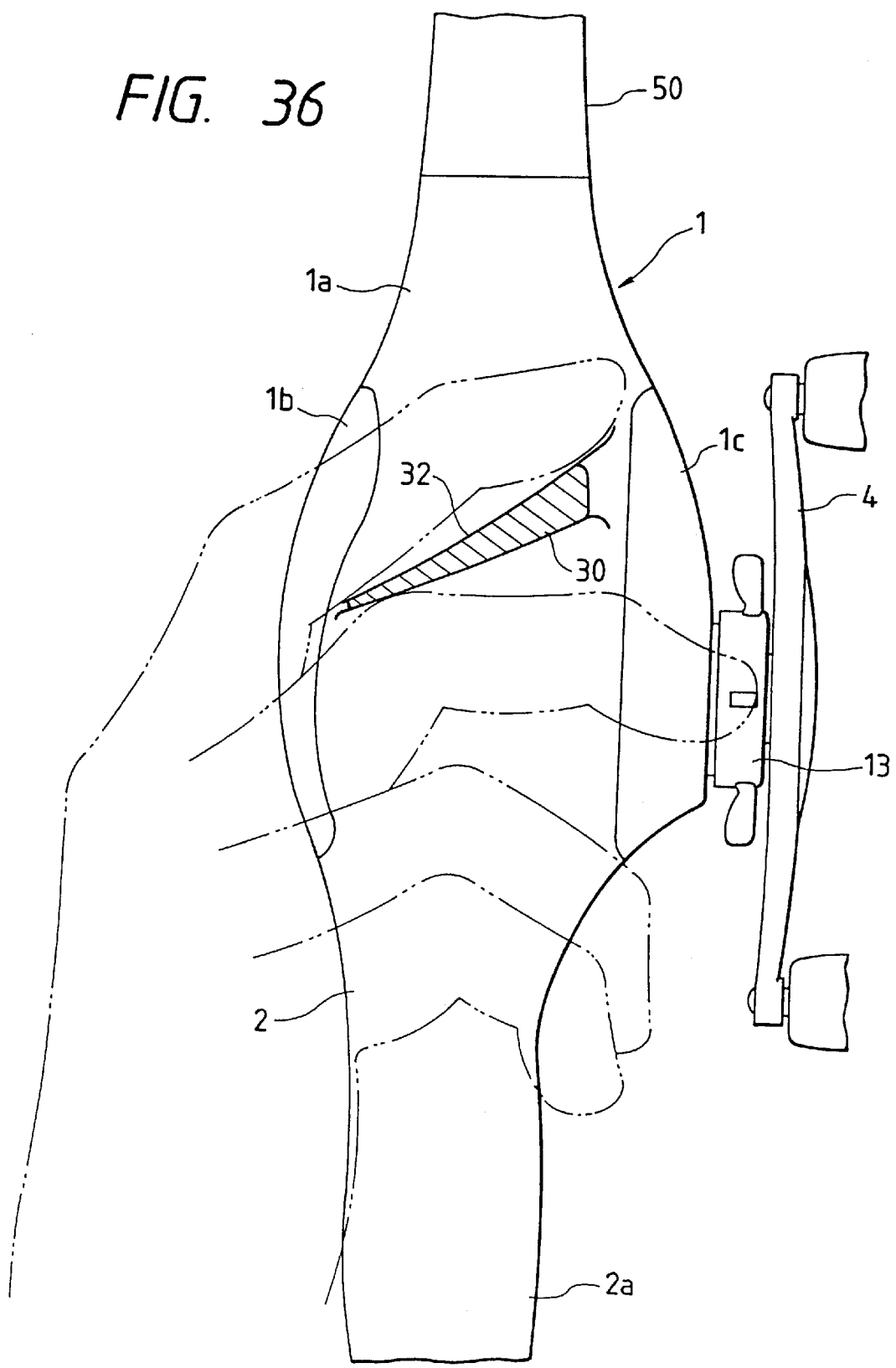

REEL FOR FISHING WITH INTEGRAL REEL BODY AND GRIP PORTION

BACKGROUND OF THE INVENTION

The present invention relates to a reel for fishing and more particularly to a reel for fishing which can be integrated with a fishing rod.

In order to improve the grip holdability of a reel for fishing to be mounted on a fishing rod body and to make the reel for fishing lightweight and compact, heretofore known reels for fishing are integrally mounted on the butt grip portion of a fishing rod as disclosed in, for example, Japanese Utility Model No. 9789/1974 and U.S. Pat. No. 2,120,069.

Such a reel for fishing as is integral with a fishing rod is shaped so that it is elongated in the direction in which the fishing rod is extended. The reel for fishing has a spool on which a fishline is wound, a reel body with a handle for driving the spool to rotate, and a grip portion to be gripped and held integrally with the reel body. The fishline wound on the spool is passed through the fishing rod whose butt grip portion is integral with the reel and then drawn out from the tip of the fishing rod.

When fishing is actually conducted with the reel for fishing mounted on the fishing rod, the operation of thumbing the spool is performed when the fishline is played out and the like.

However, an opening, which is formed in the top surface of the reel body for permitting the thumbing operation, is substantially rectangular in the direction in which the fishing rod is extended and besides large in size over the longitudinal direction of the spool. Therefore, the top surface of the reel body can hardly be held with the thumb that grips and holds it. In a case where a backlash occurs when the fishline is played out, it is hardly easy to remedy the backlash or to pass the fishline through the fishing rod.

Since the reel body and the grip portion are formed on the same straight line extending in the longitudinal direction of the fishing rod, the inside part near the tip of the thumb of the gripping and holding hand at the time of actual fishing is located at one side (toward the handle) with respect to the central part of the spool. However, no consideration is given to this fact, and thus the disclosed reel for fishing makes it hard to perform the operation of delicately thumbing the spool.

U.S. Pat. No. 2,536,288 also discloses in its specification a reel for fishing which is integral with a fishing rod incorporating a reel body into the hand grip of the fishing rod so as to make it lightweight and compact. This reel for fishing is provided with a finger hooking portion, which is in the form of a pointed horn placed beneath the grip shaft positioned in the rear of the reel body.

In the case of a fishing rod which is provided with a reel body fitting portion for mounting a reel, Japanese Utility Model Laid-Open No. 82765/1989 discloses a finger hooking portion which is positioned beneath and in the rear of the reel body fitting portion. This finger hooking portion is positioned in the rear of the reel body and held between the third and little fingers at the time of hooking and when a fishline is wound up. Consequently, the finger hooking portion is in the form of a downwardly pointed horn projection from the grip shaft portion of the fishing rod.

Since each of the aforementioned conventional finger hooking portion is a projections in the form of a relatively thin pointed horn, the surface area touched by the finger is small and that portion does not so much contribute to gripping stability. In other words, gripping tends to become unnatural and unsteady, thus causing the rod to totter or easily turn on its axis, and the rod has to be gripped firmly. Consequently, the angler tends to feel tired and suffer from fingerache because he is forced to concentrate energies on his hooking fingers touching that small surface. Unsteady gripping resulting from failing to firmly grip the finger hooking portion in the prior art and further lacking of feeling of fitness due to the acute touch of the finger hooking portion felt through the fingers have given an uncomfortable gripping condition. Moreover, casting and retrieving are unaccomplishable without shifting the grip portion from one hand to the other and thus the operability remains low when rod motion is attempted.

SUMMARY OF THE INVENTION

A first object of the present invention is to provide a reel for fishing which is integrally mountable on a fishing rod, which reel is designed for improvement in the grip holdability of the reel at the time of actual fishing and for a thumbing operation to be stably performable.

The present invention thus made is based on the discovery of a problem in that when the reel body of a reel for fishing which is integrally mountable on the butt grip portion of a fishing rod is firmly held, the reel body tends to become gripped and held with instability at the time of actual fishing because the direction in which the thumb is positioned does not conform to the direction in which an opening formed in the reel body is extended.

The problem with such a reel for fishing which is integrally mountable on the butt grip portion of the fishing rod having the reel body provided with a spool on which a fishline is wound and a handle for driving the spool to rotate, and a grip portion to be gripped and held integrally with the reel body at the time of actual fishing is made solvable by forming an opening for making possible the operation of thumbing the spool along the direction of the thumb of the hand when the grip portion is gripped and held.

At the time of actual fishing, the reel body and the grip portion are integrally gripped and held. If the gripping-holding operation is surely performed with stability, the thumb is inevitably situated in a tilted direction with respect to the direction in which the grip portion is extended. Since the opening for making possible the operation of thumbing the spool is formed in the reel body along the direction of the thumb to ensure that the gripping-holding operation is performed, the thumbing operation above at the time of actual fishing can be performed with stability.

The present invention thus made is based on the fact that since the reel body and the grip portion are formed on the same straight line, the inside part near the tip of the gripping-holding thumb of the hand at the time of actual fishing tends to become one-sided from the central part of the spool, thus making it hard to perform the operation of delicately thumbing the spool.

In order to solve the problem above, the reel for fishing according to the present invention has the reel body provided with the spool on which the fishline is wound and the handle for driving the spool to rotate, and the grip portion to be gripped and held integrally with the reel body at the time of actual fishing, the fishing rod being fittable in the leading end portion of the reel in the direction in which the fishline is played out, is characterized by deflecting or tilting the grip portion with respect to a straight line passing through the central part of the spool of the reel body.

In other words, the grip portion gripped and held integrally with the reel body is arranged so that the inside part near the tip of the thumb gripping and holding that portion is positioned in the central part of the spool, whereby the thumbing operation at the time of actual fishing is performable in the central area of the spool with stability.

A second object of the present invention is to provide a reel for fishing which is integrally mountable on a fishing rod, which reel is designed for improvement in the grip holdability of the reel and for facilitating the process of dealing with a backlash, if occurs, and the passing of a fishline through the fishing rod.

In order to solve the problem above, the reel for fishing according to the present invention has a reel body provided with a spool on which a fishline is wound and a handle for driving the spool to rotate, and a grip portion to be gripped and held integrally with the reel body at the time of actual fishing, the fishing rod being mountable on the leading end portion of the reel in the direction in which the fishline is played out, is characterized in that a switching cover member capable of loading the gripping-holding thumb of the hand on the fishline-playing-out side of an opening formed in the upper portion of the reel body is supported with the reel body.

At the time of actual fishing, the thumb gripping and holding the grip portion integral with the reel body is fitted to the cover member situated on the fishline-playing-out side of the opening formed in the upper portion of the reel body. The cover member can be opened and closed with respect to the reel body, and the operation of passing the fishline through the fishing rod as well as the process of dealing with the back lash that has occurred is made easily performable by keeping the cover member open.

A third object of the present invention is to provide a reel for fishing which can be gripped naturally and stably even when it is gripped lightly to ensure that a grip portion is held positively, and allows the gripping hand to fit to the grip portion, so that the operability of the reel, the fishing rod and the like is improvable.

Fishing equipment including a fishing rod and a reel according to the present invention is provided with the grip portion in which the index finger of the hand gripping the grip portion is allowed to hook a finger hooking portion, which is provided in a gripping area beneath the gripping portion, whereby even when the grip portion is lightly gripped, it is gripped naturally and stably to ensure that it is held positively.

Further, the finger hooking portion in the shape of a ridge is formed beneath the grip portion and it has been arranged so that the index finger of the hand gripping the grip portion is allowed to hook the finger hooking portion along the direction in which the ridge of the finger hooking portion is directed. Further, the longitudinal length of a finger hooking face is set at least great enough for both the central parts of the distal phalanx and the middle phalanx to hook the face easily to ensure that the grip portion is held with stability, whereby the operability of the reel, the fishing rod and the like is improvable.

BRIEF DESCRIPTION OF THE DRAWINGS

FIG. 30(a) is a vertical sectional view of a portion in proximity of a reel for fishing as a tenth embodiment of the invention illustrative of a state in which the reel has been mounted in a fishing rod, (b), (c) and (d) being sectional views of members of the respective finger hooking portions.

FIG. 36 is a bottom plan view of a portion in the proximity of a reel for fishing as a sixteenth embodiment of the invention illustrative of a state in which the reel has been mounted in a fishing rod.

DETAILED DESCRIPTION OF THE PREFERRED EMBODIMENTS

A detailed description of the preferred embodiments will subsequently be described.

Figure 1:
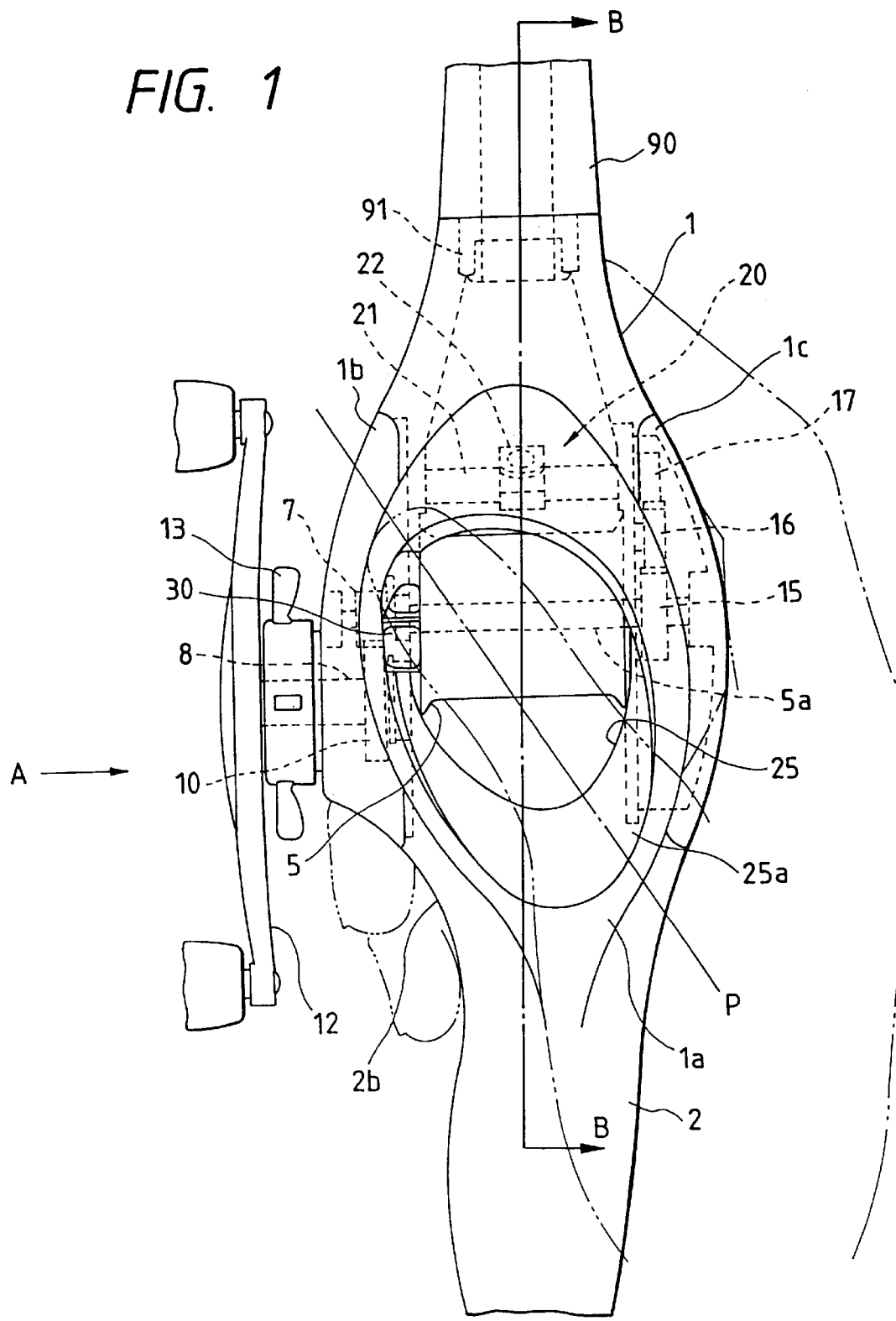
FIG. 1 is a plan view of a reel for fishing as a first embodiment of the invention illustrative of a state in which the reel has been mounted on a fishing rod.
Figure 2:
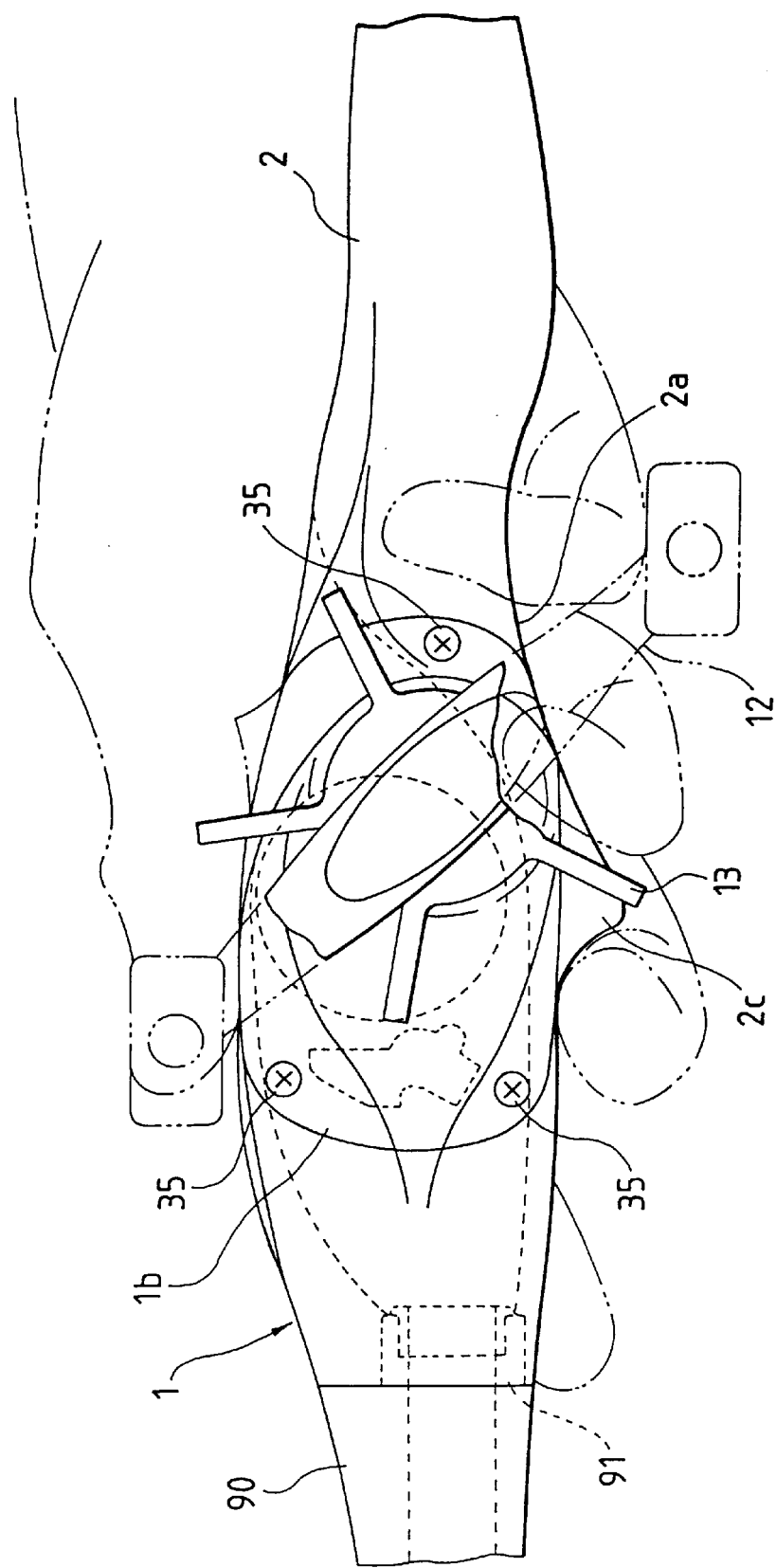
FIG. 2 is a diagram of the reel for fishing of FIG. 1 as viewed from a direction A.
Figure 3:
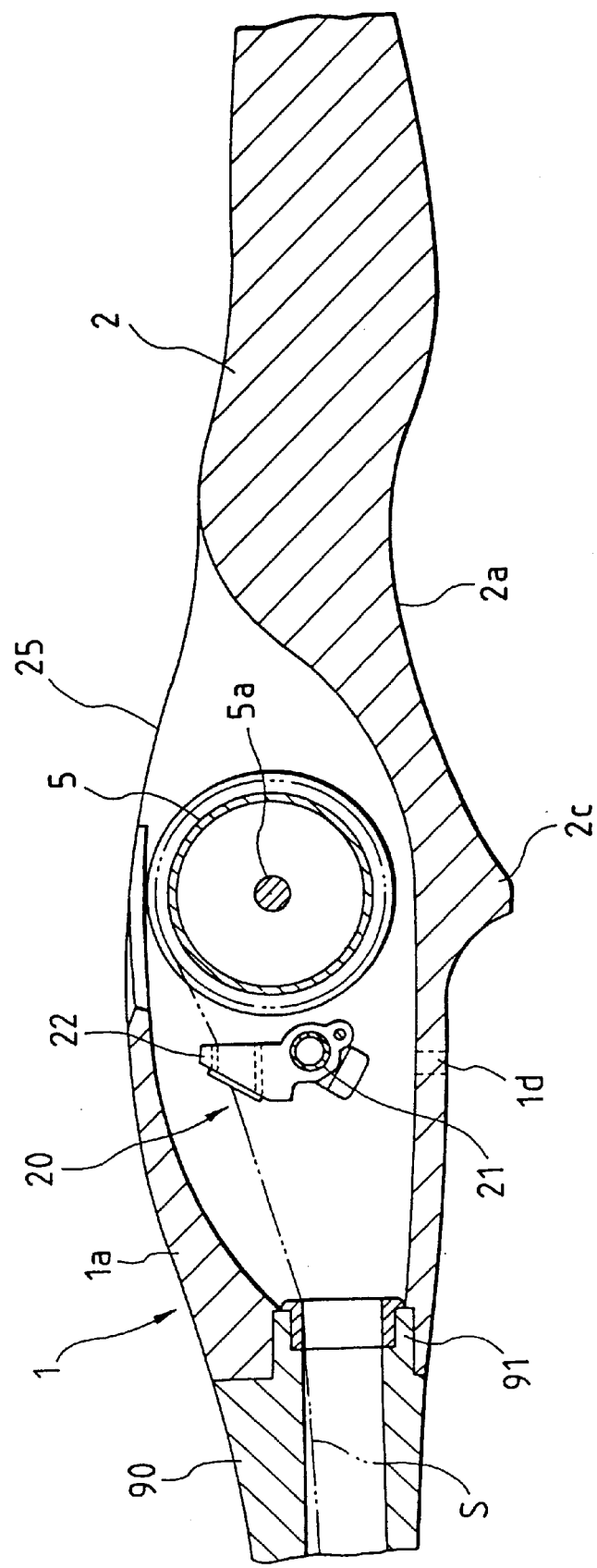
FIG. 3 is a sectional view taken on line B—B of FIG. 1.

FIG. 1 is a plan view of a reel for fishing embodying the present invention illustrative of a state in which the reel has been mounted on a fishing rod; FIG. 2 a diagram of the reel for fishing of FIG. 1 as viewed from a direction A; and FIG. 3 a sectional view taken on line B—B of FIG. 1. The reel for fishing according to the present invention is arranged so that a handle is rotated with the left hand in the winding-up direction.

A reel body 1 has a frame 1a, which is fitted with a left and a right side plate 1b, 1c, and the butt grip portion 91 of a fishing rod 90 is detachably screwed or fitted via a connection means into the leading end portion (in the direction in which a fishline is played out) of the reel body 1 or otherwise integrally bonded thereto. The outer surface of the reel body 1 is arranged so that the outer surface thereof is integrally connected to the outer surface of the fishing rod 90 and that the dimensions thereof in the height and width directions are gradually increased from an area where the fishing rod is fitted in up to a spool supporting area and besides they are gradually decreased rearward so as to form a smooth surface. A grip portion 2 is formed in an area where the above dimensions are gradually decreased rearward from the spool supporting area, the grip portion 2 being gripped and held with the thenar region and the little finger region of the palm as shown by chain double-dashed lines of FIG. 1.

In the grip portion 2, smooth recesses 2a, 2b which are recessed toward the central side in the height and width directions are preferably formed, as shown in FIG. 1, to ensure that the third and little fingers that grip and hold the grip portion 2 are retained thereby. Moreover, a protruded portion (trigger) 2c is preferably formed in an underside area ranging from the reel body 1 up to the grip portion 2 to ensure that the middle finger gripping and holding the grip portion 2 is retained thereby. Further, a drainage opening 1d is preferably formed in a proper place of the undersurface of the reel body 1.

In between the left and right side plates 1b, 1c mounted in the frame 1a of the reel body 1, a spool shaft 5a fitted with a spool 5 is rotatably supported via bearings. A pinion 7 is slidably and axially provided on one end side of the spool shaft 5a and is made to engage with a driving gear 10 mounted on a handle shaft 8. Consequently, the spool 5 is driven to rotate via the driving gear 10 and the pinion 7 when a handle 12 mounted on the handle shaft 8 is rotated. In this case, the handle shaft 8 is fitted with a known drag mechanism, whereby drag regulation is made possible by rotating a control regulator 13.

A gear 15 is mounted on the other side of the spool shaft 5a, and a gear 17 fitted with the traverse shaft 21 of a level wind unit 20 via a gear 16 is made to engage with the gear 15. A line guide 22 reciprocating between the left and right side plates 1b, 1c as the gear 17 rotates is engaging with the traverse shaft 21, and a fishline S wound on the spool 5 is passed via the line guide 22 through the fishing rod 90. When the handle 12 is rotated in the winding-up direction, the line guide 22 of the level wind unit 20 is laterally reciprocated via the gears 15–17 and the traverse shaft 21 together with the winding-up rotation of the spool 5, whereby the fishline is wound up in parallel to the spool 5. The level wind unit 20 like this may be arranged so that its traverse shaft is provided in the rear of the spool 5 or the level wind unit itself may be omitted.

In the top surface of the reel body 1, there is formed an opening 25 for making possible the operation of thumbing the spool 5 when the reel body 1 and the grip portion 2 are gripped and held. This opening 25 is formed along the direction of the thumb of the hand when the grip portion 2 and the reel body 1 are gripped and held. According to this embodiment of the invention, the grip portion 2 is formed in such a way as to conform substantially to the direction of the center line of the fishing rod 90 and when the reel body 1 and the grip portion 2 are gripped and held positively, the thumb is situated so that it tilts toward the handle side 12 as shown by a line P of FIG. 1. Therefore, the opening 25 is formed parallel to the direction of the thumb so as to tilt toward the handle side 12 with respect to the direction in which the mounted fishing rod is extended. Incidentally, a tapered portion 25a tilting inward is preferably formed on the peripheral edge portion of the opening 25 in order that the digital pulp portion of the thumb is easily brought into contact therewith.

The opening 25 is thus formed in the top surface of the reel body 1 along the direction of the thumb when the reel body 1 and grip portion 2 are gripped and held positively to ensure that the thumbing operation at the time of actual fishing makes the grip portion gripped and held.

A known clutch mechanism (not shown) is made to engage with the pinion 7 mounted on the spool shaft 5a. The clutch mechanism transmits torque from the handle 12 by axially sliding the pinion 7 (clutch ON: fishline winding-up state) or otherwise cuts off the torque transmission (clutch OFF: fishline playing-out state) and the switching operation is performed by operating a clutch switching member 30. The mounting position and operating direction of the clutch switching member 30 may be varied diversely. According to this embodiment of the invention, the clutch mechanism is arranged so that it is slidable longitudinally in the proximity of the tip position of the thumb; thus the clutch switching operation is made performable while the reel body 1 and the grip portion 2 is gripped and held.

Figure 4:
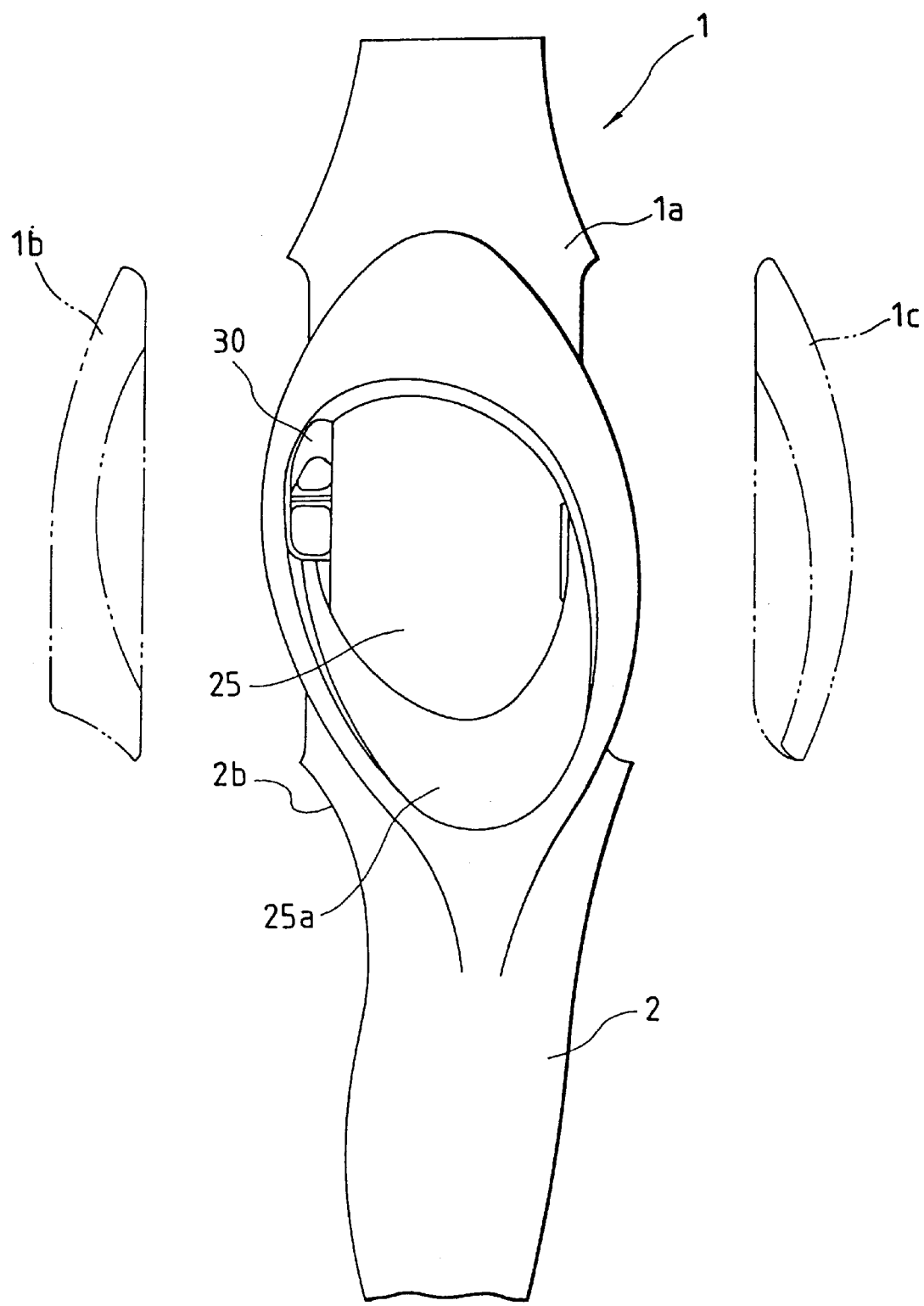
FIG. 4 is a diagram of the reel for fishing of FIG. 1 with both left and right side plates removed.
Figure 5:
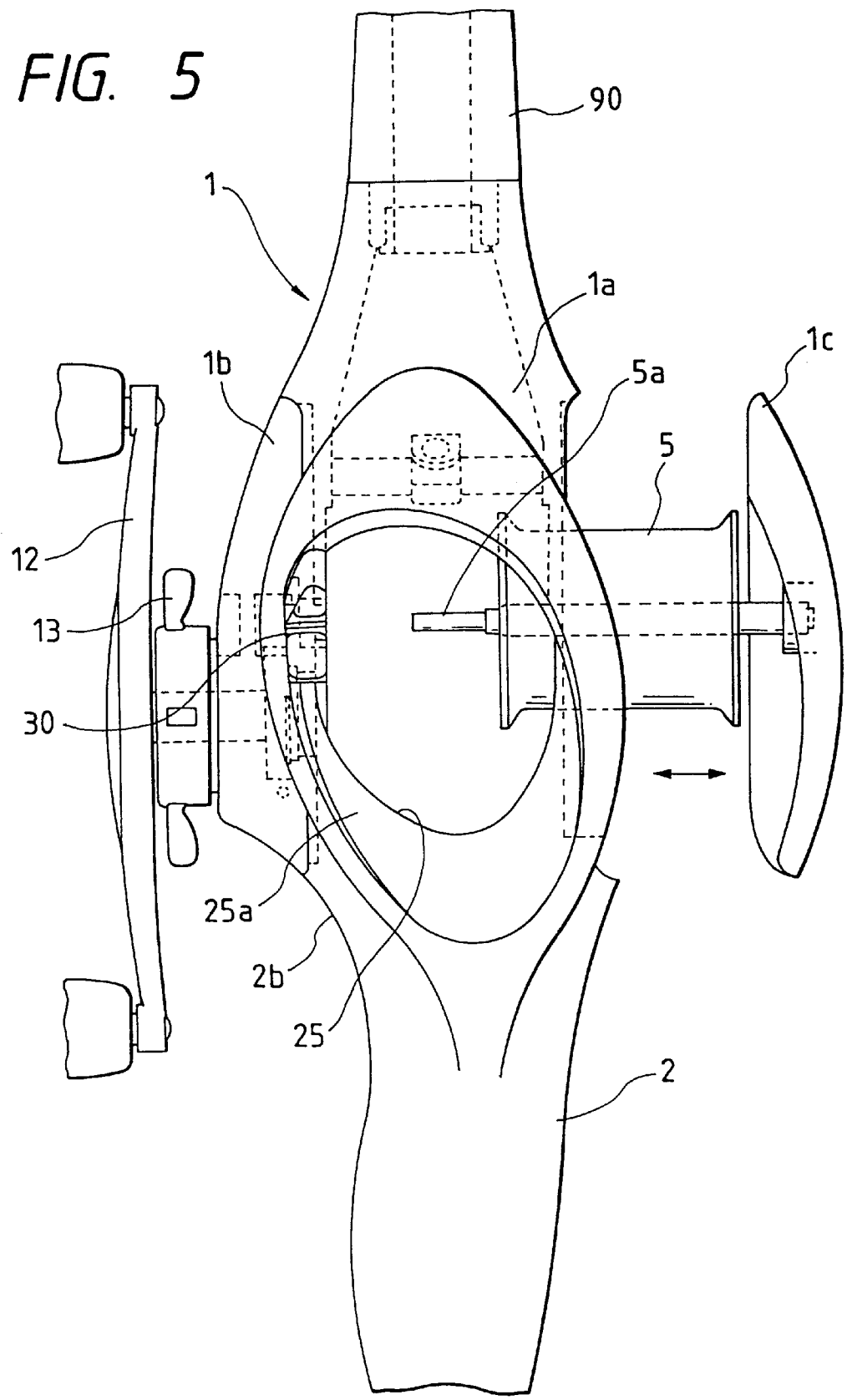
FIG. 5 is a diagram of the reel for fishing of FIG. 1 with not only the right side plate but also the spool portion removed.

The side plates 1b, 1c of the reel body 1 is, as shown in FIG. 4, detachable from the frame 1a of the reel body 1. In other words, while the side plates 1b, 1c are detached from the frame 1a, the handle, the drag mechanism, the clutch mechanism and the like are incorporated in the frame of the reel body. Moreover, the spool 5 is replaceable and the process of dealing with a backlash is performable by removing the right side plate 1c from the frame 1a. The side plates 1b, 1c are removed from the frame 1a by means of screws 35 properly disposed as shown in FIG. 2.

When the fishing rod integrating the reel for fishing is used for fishing, the clutch switching member 30 is turned off through the casting operation to cast terminal tackles. The third and little fingers are retained by the recesses 2a, 2b and the middle finger is retained by the trigger 2c positively during the playing-out operation as shown in FIGS. 1–2 to ensure that the reel body 1 and the grip portion 2 remain gripped and held. Further, the thumb is used to perform the operation of braking the spool 5 during the casting operation, and the opening 25 is formed along the direction in conformity with the direction of the thumb in the state in which the reel body 1 and the grip portion 2 have surely been gripped and held, so that the grip maintainability of the reel is prevented from becoming unsteady. Then the thumb is used to turn on the clutch switching member 30 after the terminal tackles have landed on the water and the winding-up operation of the handle 12 is performed. Even during the thumbing operation above, strike sensitivity is improved since the shape of the opening 25 ensures that the grip maintainability of the reel body 1 and the grip portion 2 is kept steady.

Although a description has been given of the embodiment of the present invention, the invention is not limited to the above embodiment thereof but may be modified in various manners. In the drawings illustrative of the following modified examples, like reference characters designate like component members in the above embodiment of the invention.

Figure 6:
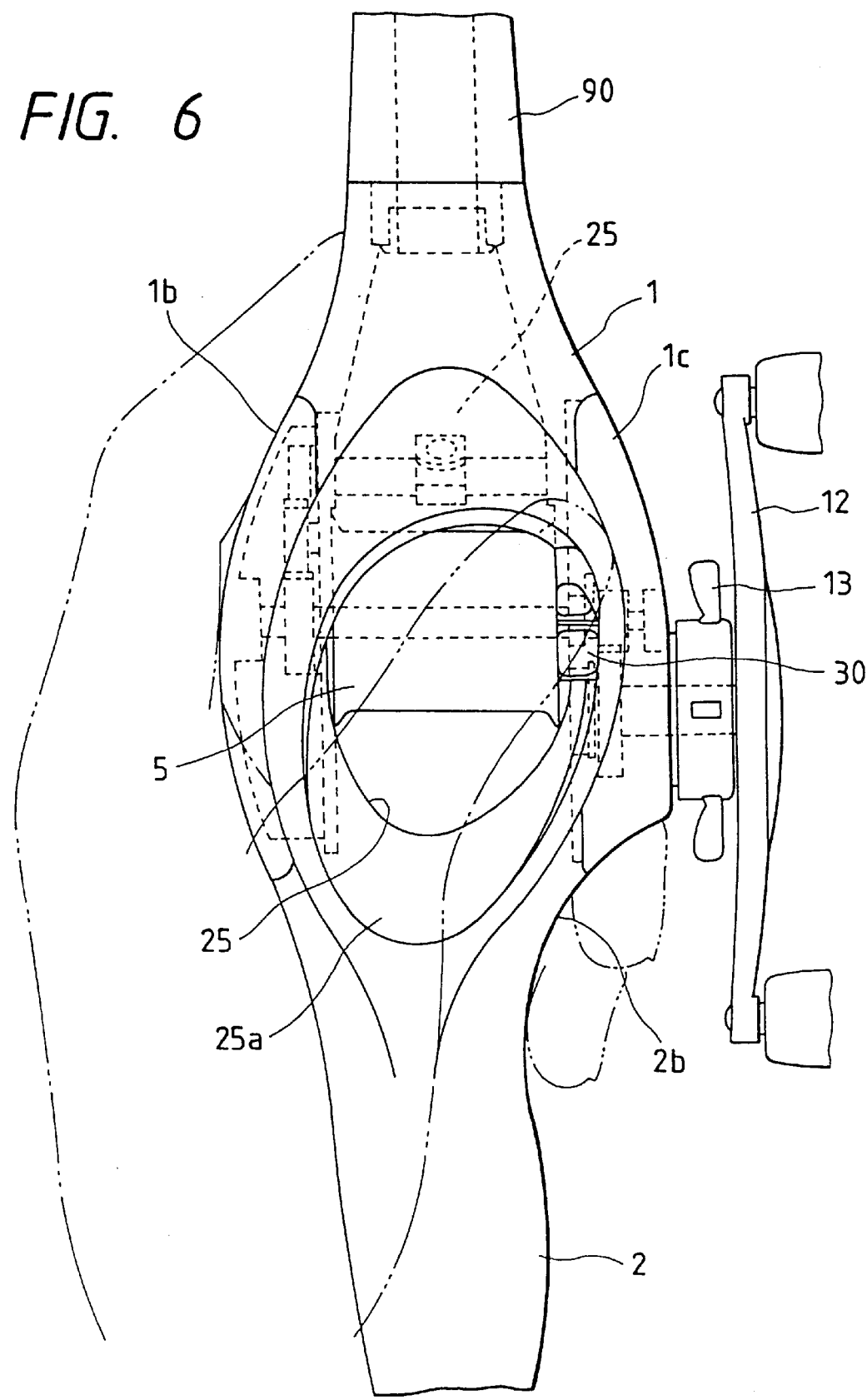
FIG. 6 is a diagram illustrative of a first modified example of the reel for fishing according to the present invention.

Although it has been arranged in the above embodiment of the invention that the handle is operated with the left hand, the handle may be operated with the right hand as shown in FIG. 6. As is obvious from FIG. 6, the opening 25 is formed along a direction in conformity with the direction of the thumb when the reel body 1 and the grip portion 2 are gripped and held with the left hand.

Figure 7:
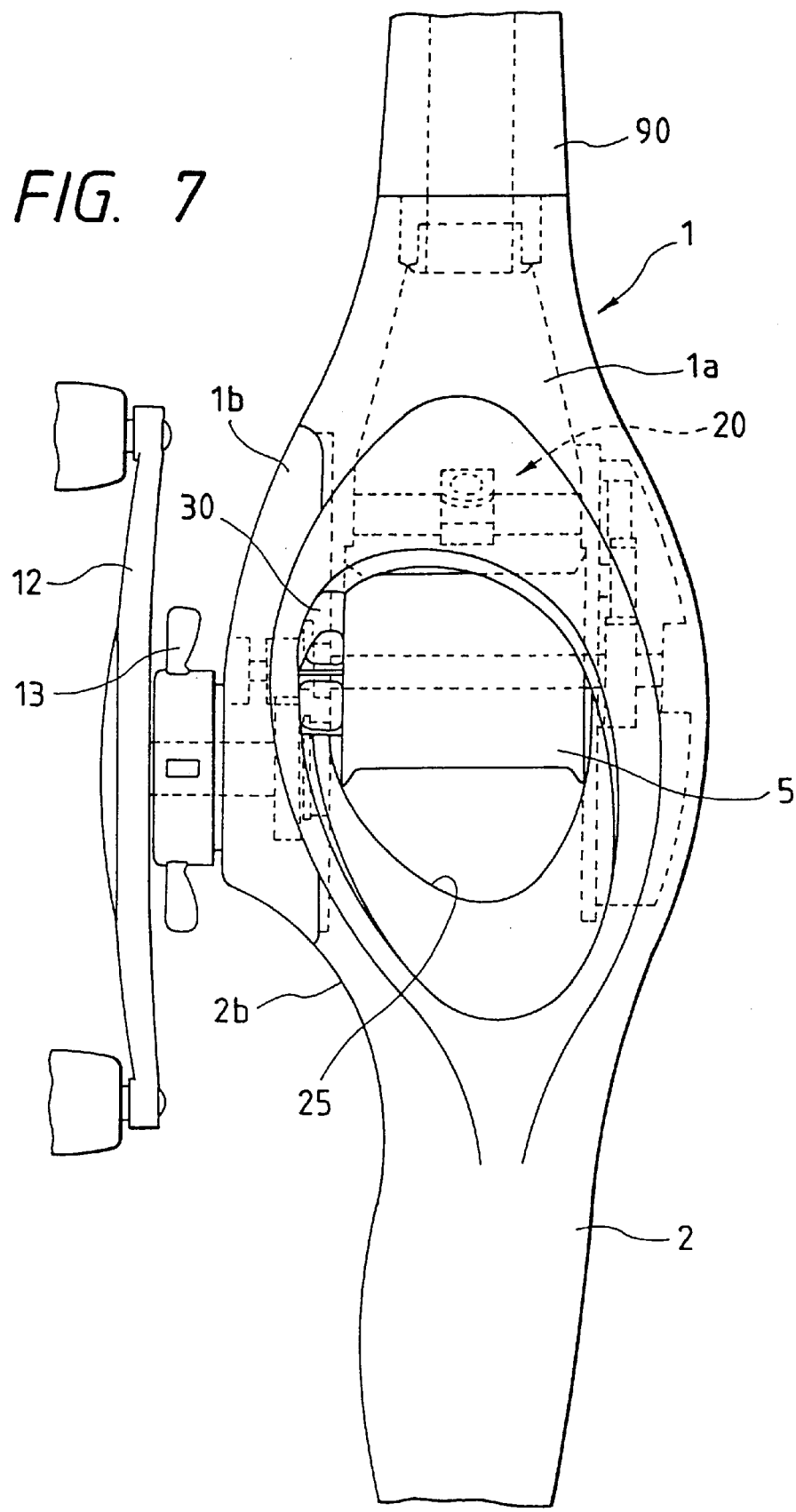
FIG. 7 is a diagram illustrative of a second modified example of the reel for fishing according to the present invention.

FIG. 7 shows a modified example in which the side plate 1c on the counter-handle side of FIG. 1 is integrated with the reel body 1 and the frame 1a. It is thus possible to make the internal mechanism waterproof by integrating the side plate with the frame.

Figure 8:
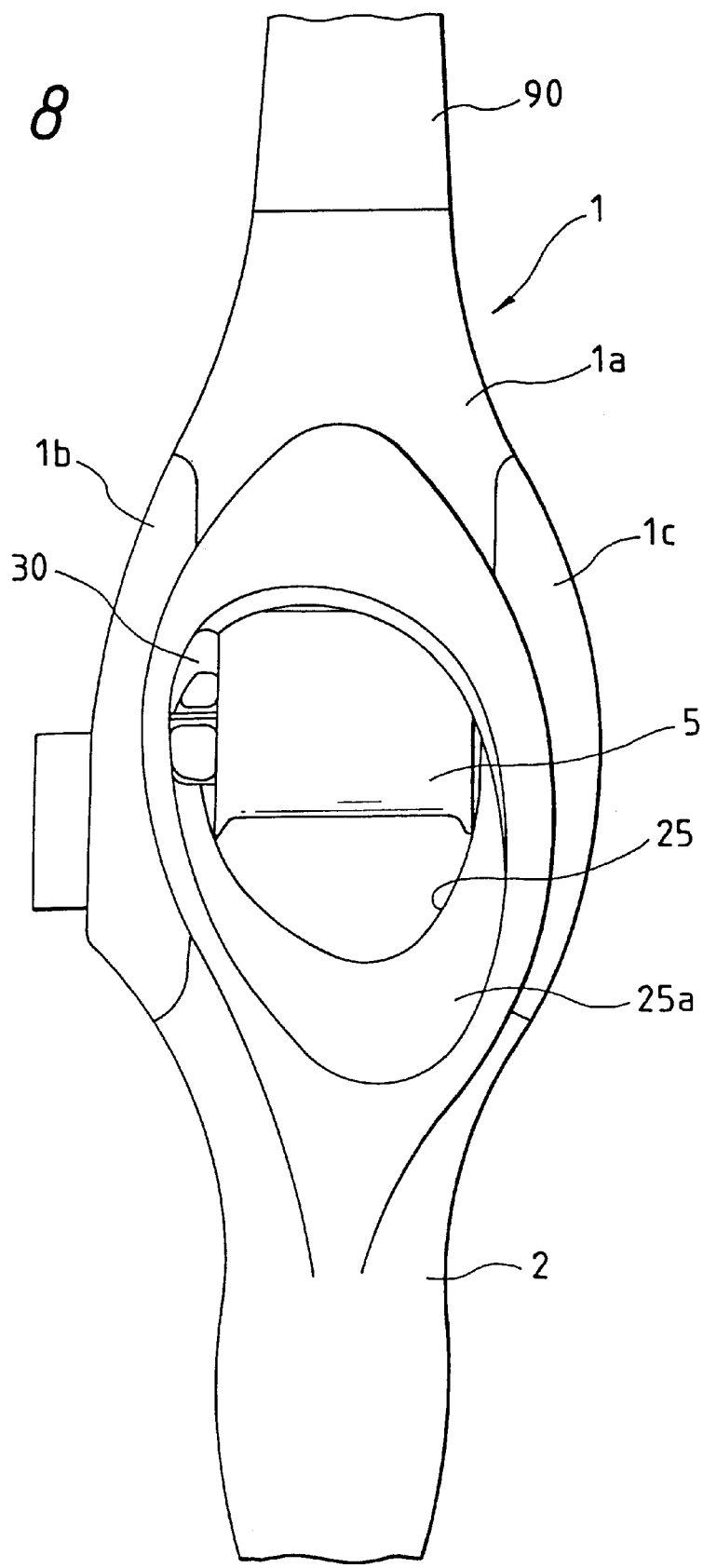
FIG. 8 is a diagram illustrative of a third modified example of the reel for fishing according to the present invention.
Figure 9:
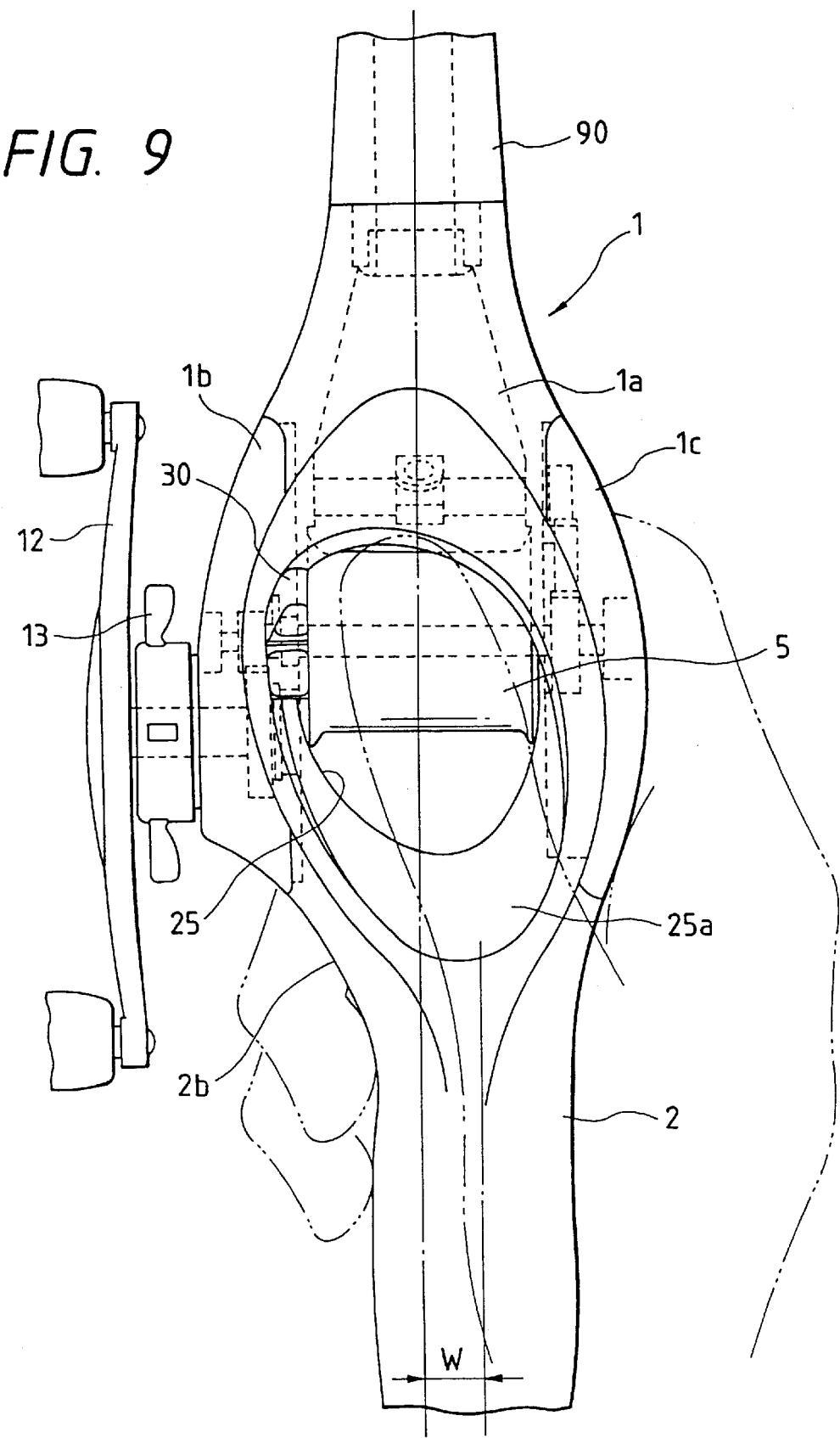
FIG. 9 is a diagram illustrative of a fourth modified example of the reel for fishing according to the present invention.

FIGS. 8–9 refer to the modified shape and arrangement of the grip portion 2 to be gripped and held integrally with the reel body 1. The modified example of FIG. 8 shows that the center line of the grip portion 2 is made to conform to that of the reel body 1 (fishing rod 90) precisely without deeply depressing the recess 2b of the grip portion 2 formed in FIG. 1. Thus the shape of the grip portion 2 may be modified in various manners so that the grip portion 2 is easily gripped and held according to its diameter and the like. FIG. 9 shows a modified example in which like a second embodiment of the invention which will be described later, the grip portion 2 is offset by W toward the counter-handle side with respect to the center line of the reel body 1 (fishing rod 90). When the reel body 1 and grip portion 2 are gripped and held positively, the tip of the thumb is normally deflected to the handle side. With attention directed to this fact, the grip portion 2 is offset toward the counter-handle side with respect to the center line of the reel body 1 and the digital pulp portion of the thumb is, as shown in FIG. 9, positioned substantially in the central part of the reel body 1 so as to increase the gripping and holding stability. In this case, the grip portion 2 may be not only offset but also tilted with respect to the center line of the reel body 1. Thus the direction of the thumb is slightly deflected when the reel body 1 and the grip portion 2 are gripped and held positively; however, the shape of the opening 25 may be varied diversely, depending on the deflected direction.

Figure 10:
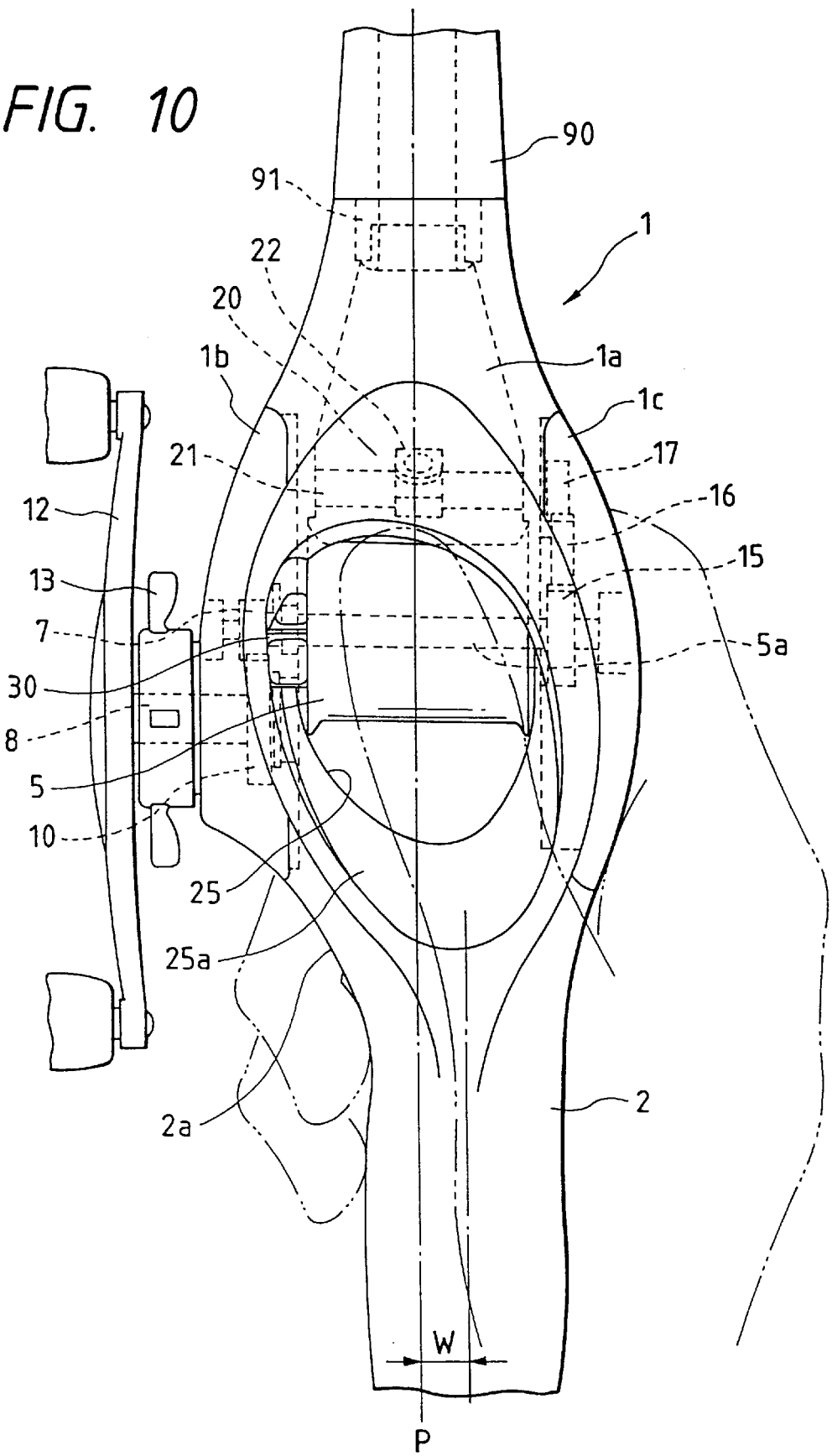
FIG. 10 is a plan view of a reel for fishing as a second embodiment of the invention illustrative of a state in which the reel has been mounted on a fishing rod.
Figure 11:
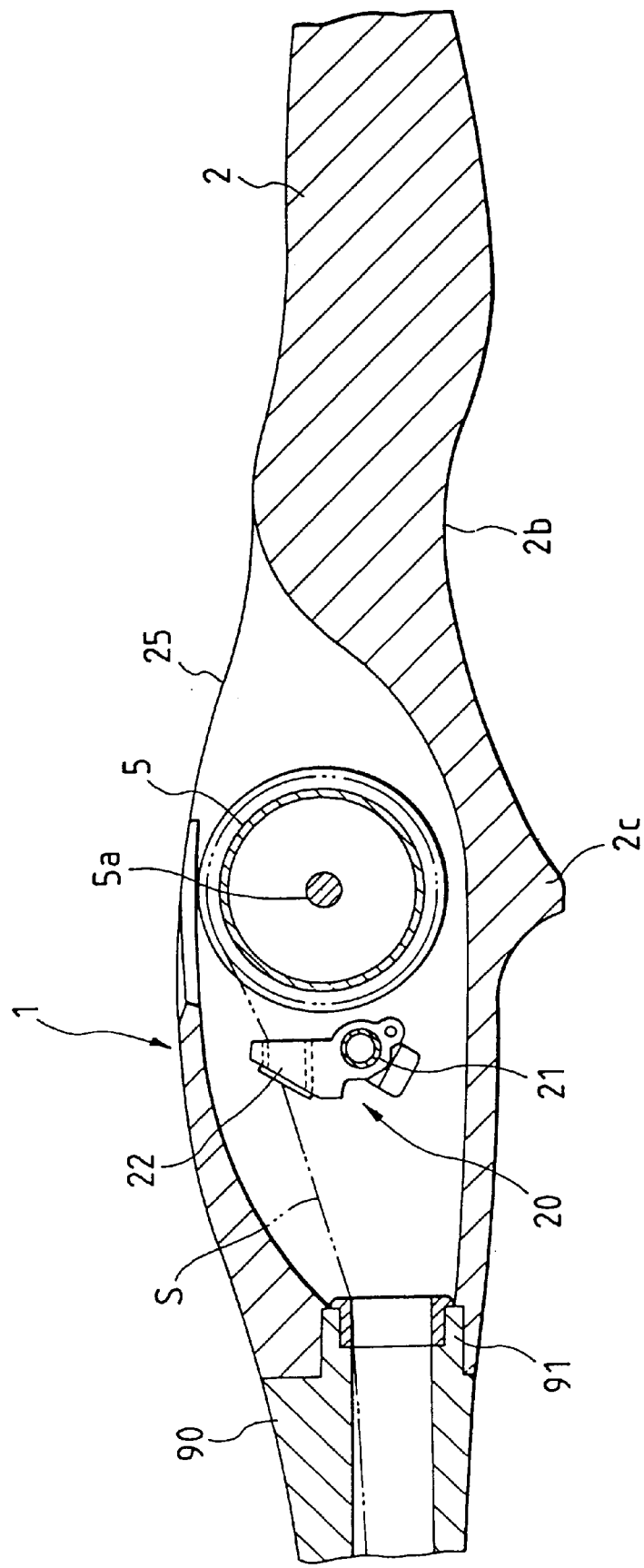
FIG. 11 is a vertical sectional view of the reel for fishing as shown in FIG. 10.

FIG. 10 is a plan view of a reel for fishing as a second embodiment of the invention illustrative of a state in which the reel has been mounted on a fishing rod; and FIG. 11 a vertical sectional view of the reel for fishing as shown in FIG. 10. The reel for fishing according to this embodiment of the invention is arranged so that the handle is rotated with the left hand in the winding-up direction.

As shown in FIG. 10, the grip portion 2 to be gripped and held integrally with the reel body is formed integrally with the reel body 1 in such a state that it is deflected by W to the counter-handle side with respect to a straightly line P passing through the central part of the spool 5 of the reel body 1. In other words, the digital pulp portion of the thumb shifts from the central part of the spool 5 toward the handle side when the reel body 1 and the grip portion 2 are gripped and held naturally with the grip portion 2 in conformity with the straight line P and therefore the position of the digital pulp portion is positioned in the central part of the spool 5 by deflecting the grip portion 2 to the counter-handle side. Consequently, since the operation of thumbing the spool at the time the reel body 1 and the grip portion 2 are gripped and held naturally is performable in the central part of the spool 5, it can be performed easily and stably.

As in the first embodiment of the invention, the opening 25 in the top surface of the reel body 1 is preferably formed along the direction of the thumb of the hand when the reel body 1 and the grip portion 2 are gripped and held as shown in FIG. 10. In other words, if the reel body 1 and the grip portion 2 are gripped and held positively, the thumb is situated in a direction tilting toward the handle side 12 with respect to the direction in which the grip portion 2 is extended. Therefore, the operation of thumbing the spool is made performable by tilting the opening 25 toward the handle side 12 along the direction of the thumb with respect to the straight line P to ensure that the grip portion is gripped and held positively.

With the arrangement above, the thumbing operation at the time of actual fishing is performable in the central part of the spool 5 to ensure that the grip portion is gripped and held with stability. The smooth recesses 2a, 2b which are recessed toward the central side in the width and height directions are preferably formed, as shown in FIG. 10, in the grip portion 2 to ensure that the third and little fingers gripping and holding the grip portion are retained thereby. Further, the protruded portion (trigger) 2c is preferably formed in the underside area ranging from the reel body 1 up to the grip portion 2 to ensure that the middle finger gripping and holding the grip portion 2 is retained thereby.

Figure 12:
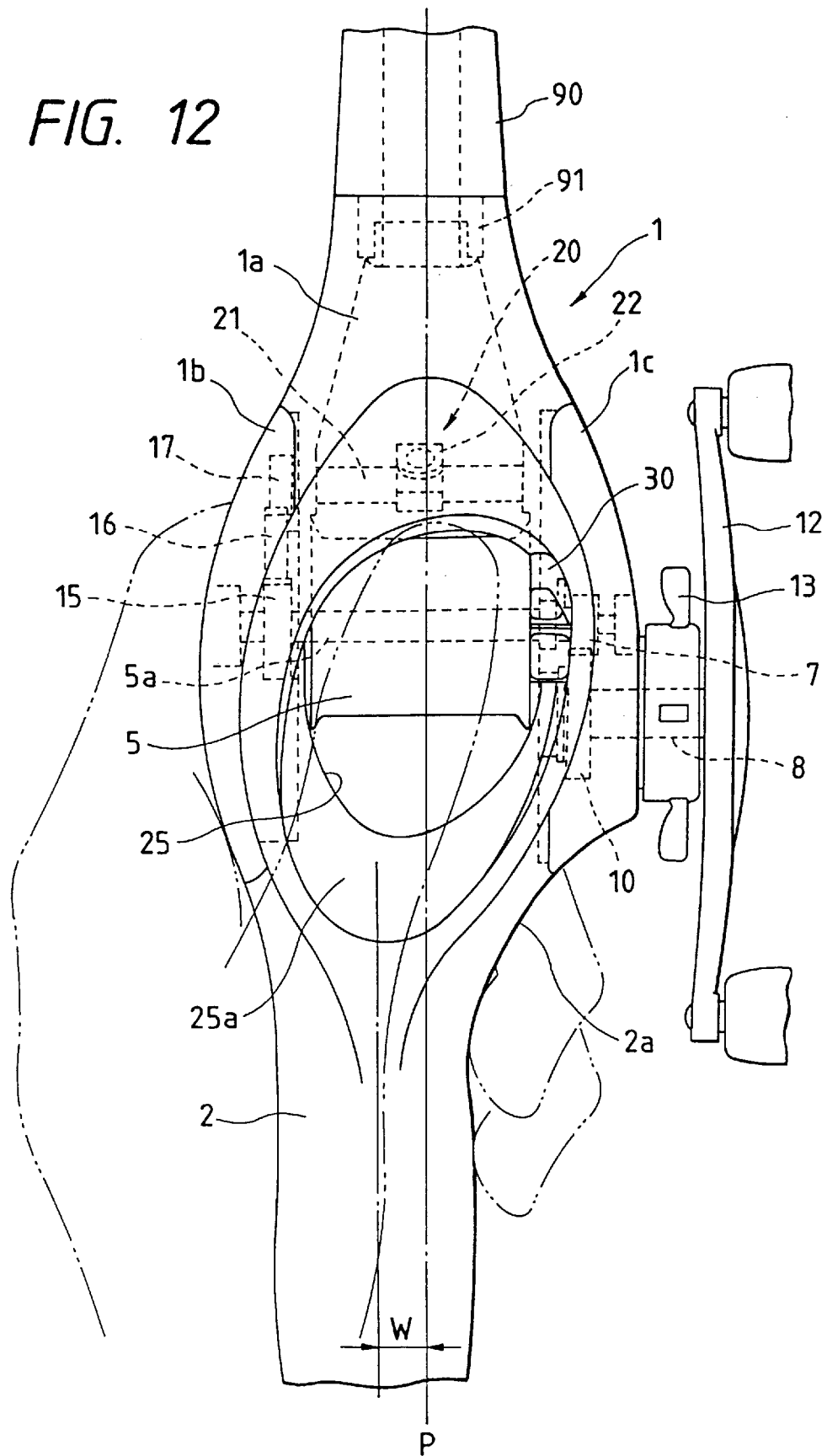
FIG. 12 is a diagram illustrative of a first modified example of the reel for fishing as shown in FIG. 10.
Figure 13:
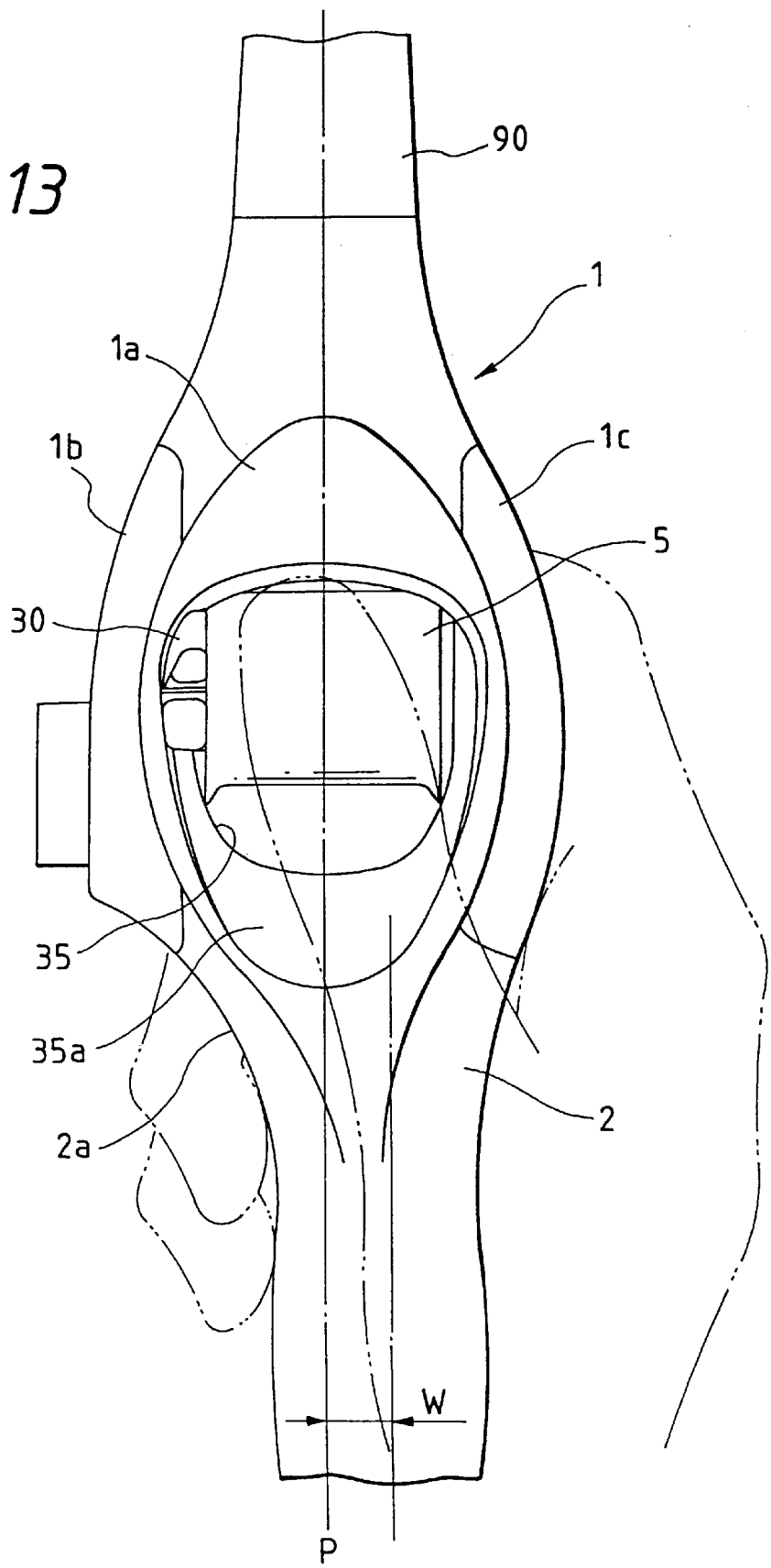
FIG. 13 is a diagram illustrative of a second modified example of the reel for fishing as shown in FIG. 10.
Figure 14:
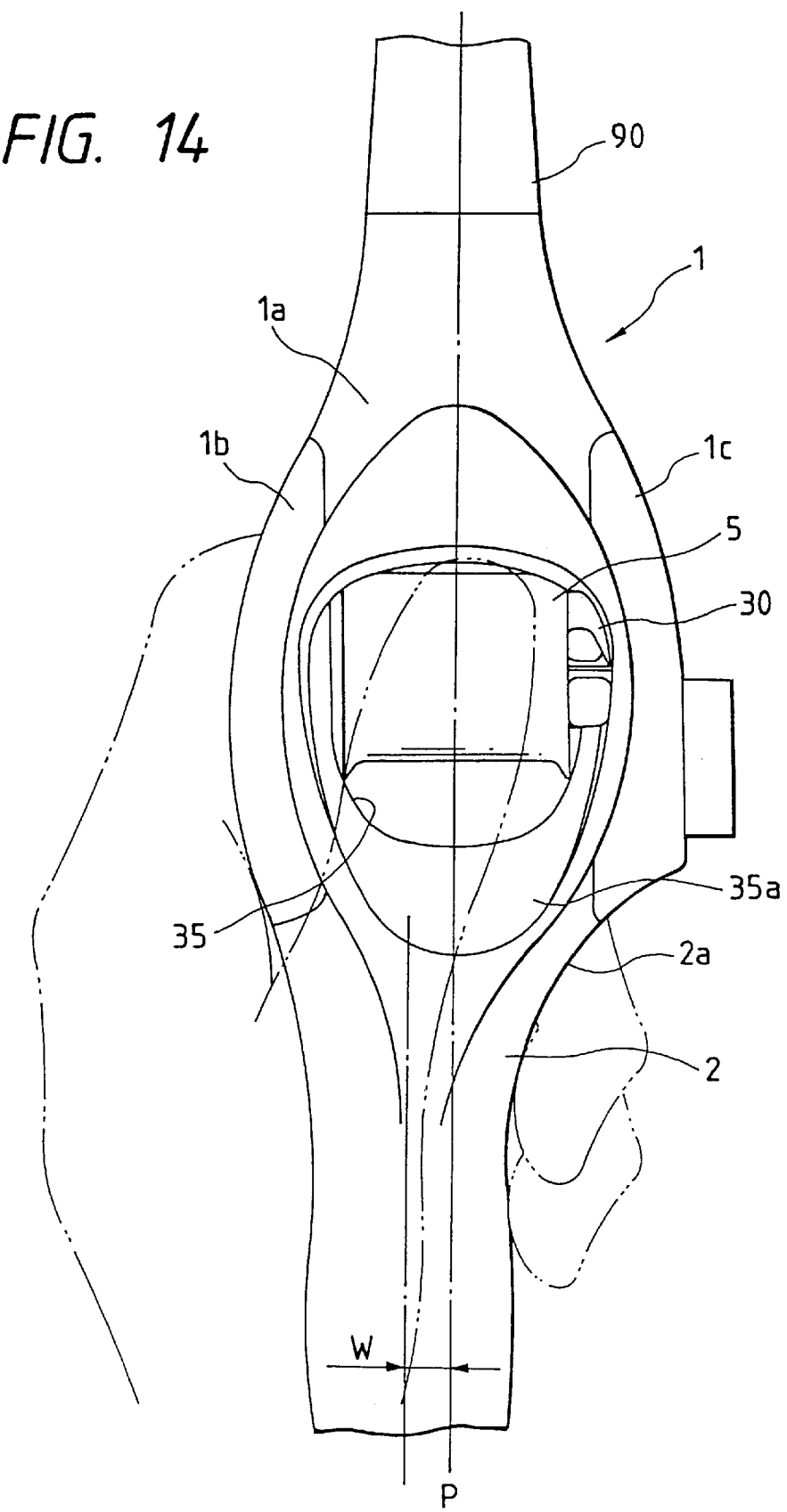
FIG. 14 is a diagram illustrative of a third modified example of the reel for fishing as shown in FIG. 10.

Although a description has been given of the embodiment of the present invention, the invention may be modified in various manners in addition to the above-described embodiments thereof like those shown in FIGS. 12–14, for example.

A modified example of FIG. 12 has the same arrangement as what is shown in FIG. 10 and is arranged so that the handle is rotatable with the right hand. Modified examples of FIGS. 13–14 have the same arrangement as what are shown in FIGS. 10–12 respectively except that the opening 25 is varied. More specifically, the shape of the opening 25 in the modified examples is such that though the opening 25 shown in FIGS. 10–12 is formed along the direction in conformity with the direction of the thumb gripping and holding the reel body 1 and the grip portion 2, an opening 35 according to this modified example is formed bilaterally symmetrically with respect to the straight line P so as to make the whole spool wide open. With the grip portion 2 thus arranged, the digital pulp portion of the thumb is inevitably positioned in the central part of the spool 5, so that the shape of the opening may be varied diversely. Even in the modified example, a tapered portion 35a tilting inward is preferably formed so as to make the digital pulp portion of the thumb easily contact the peripheral edge portion.

A description will subsequently be given of a third embodiment of the invention by reference to FIG. 15.

Figure 15:
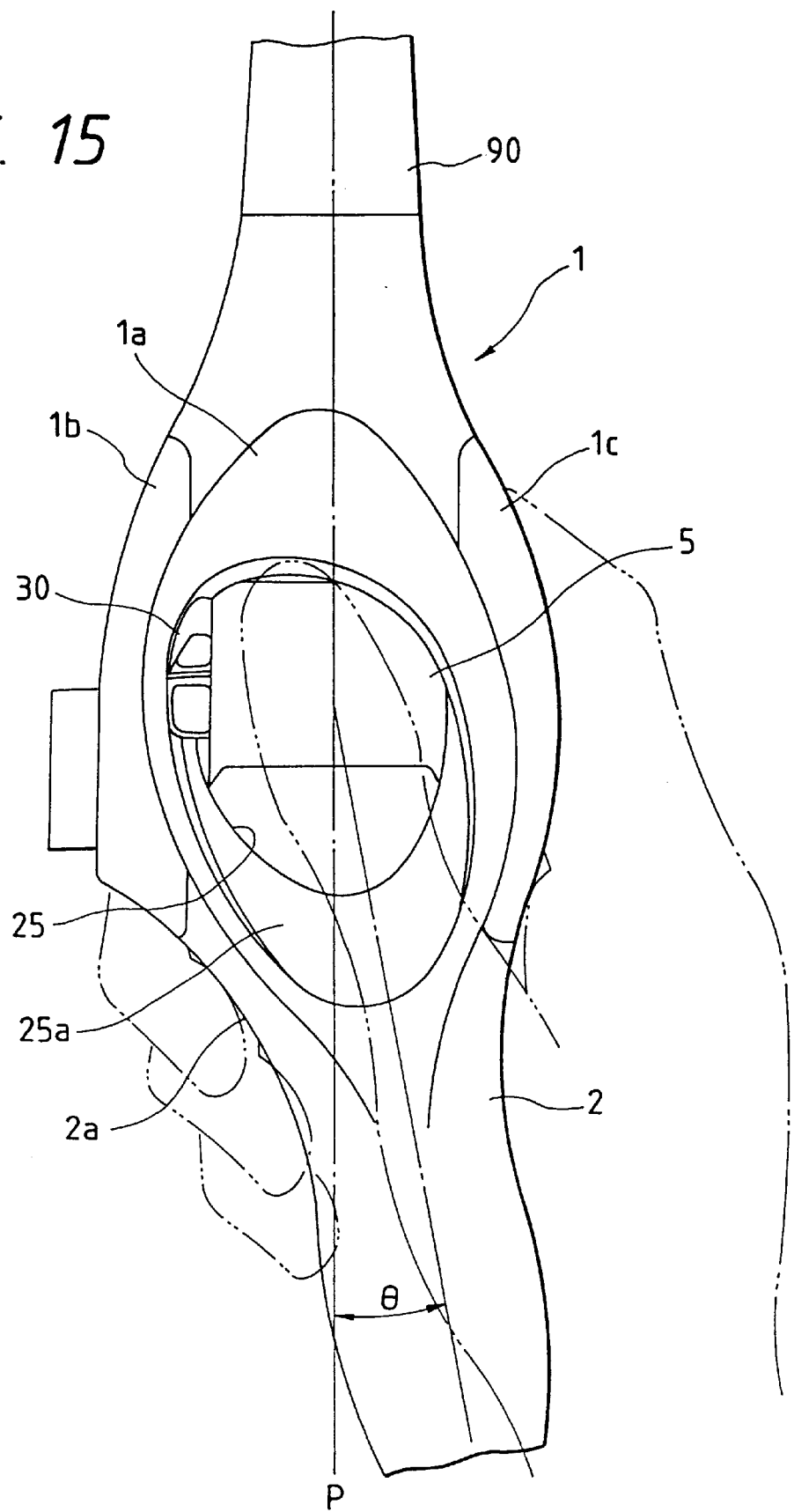
FIG. 15 is a diagram illustrative of a reel for fishing as a third embodiment of the invention.

According to this embodiment of the invention, the same arrangement as shown in FIG. 10 is made except for the grip portion 2 in that the grip portion to be gripped and held integrally with the reel body is, as shown in FIG. 15, integrally formed with the reel body 1 in such a state that it is tilted by an angle of θ with respect to the straight line P passing through the central part of the spool 5 of the reel body 1. Thus the position of the hand actually gripping and holding the grip portion 2 is deflected to the counter-handle side as in the arrangement of FIG. 10 even when the grip portion 2 is tilted with respect to the straight line P, whereby the digital pulp portion of the thumb is positioned in the central part of the spool 5 when the reel body 1 and the grip portion 2 are gripped and held naturally. Since the thumbing operation is readily and stably performable in the central part of the spool 5, it can be performed readily and stably.

Figure 16:
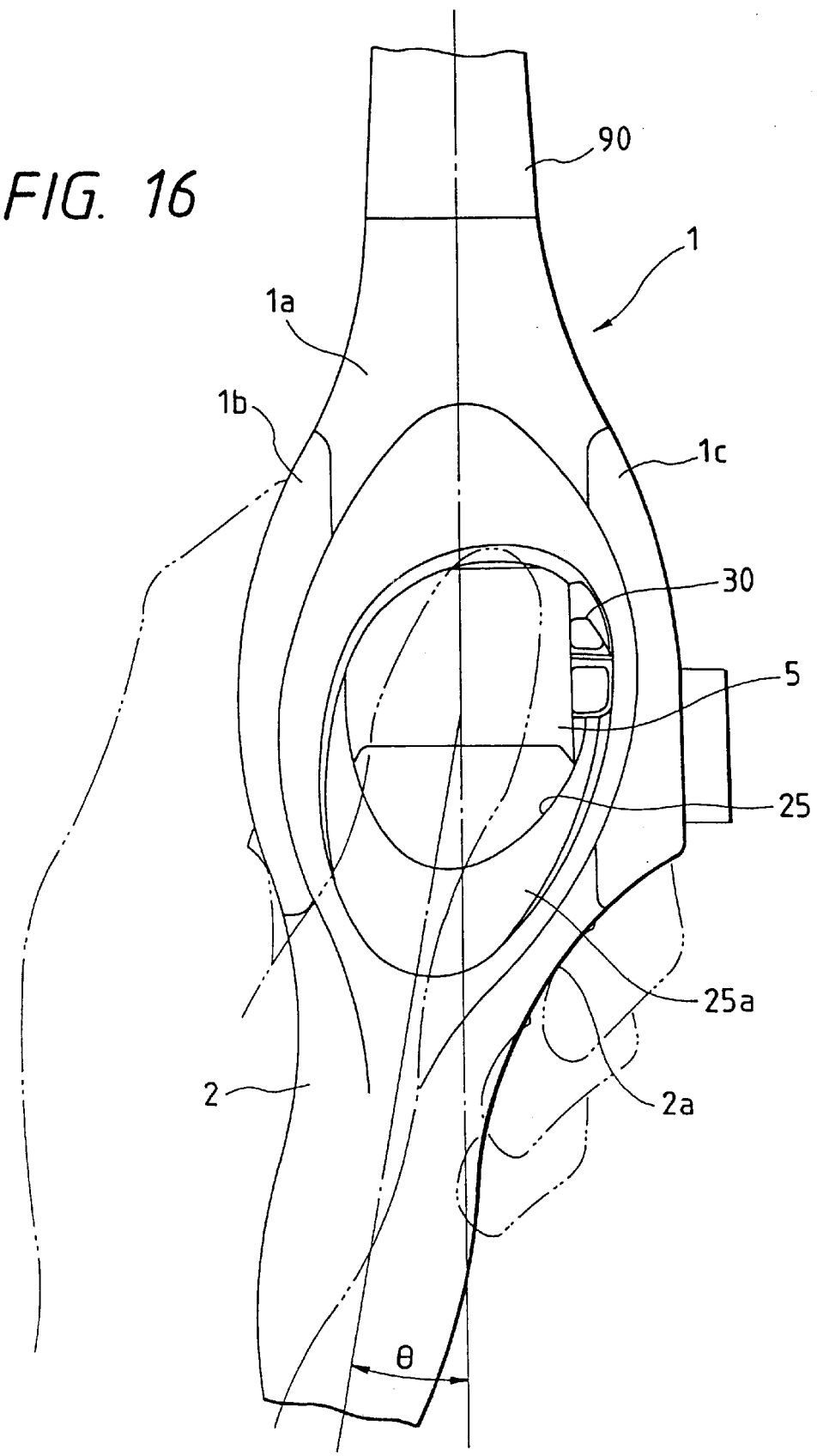
FIG. 16 is a diagram illustrative of a first modified example of the reel for fishing as shown in FIG. 15.
Figure 17:
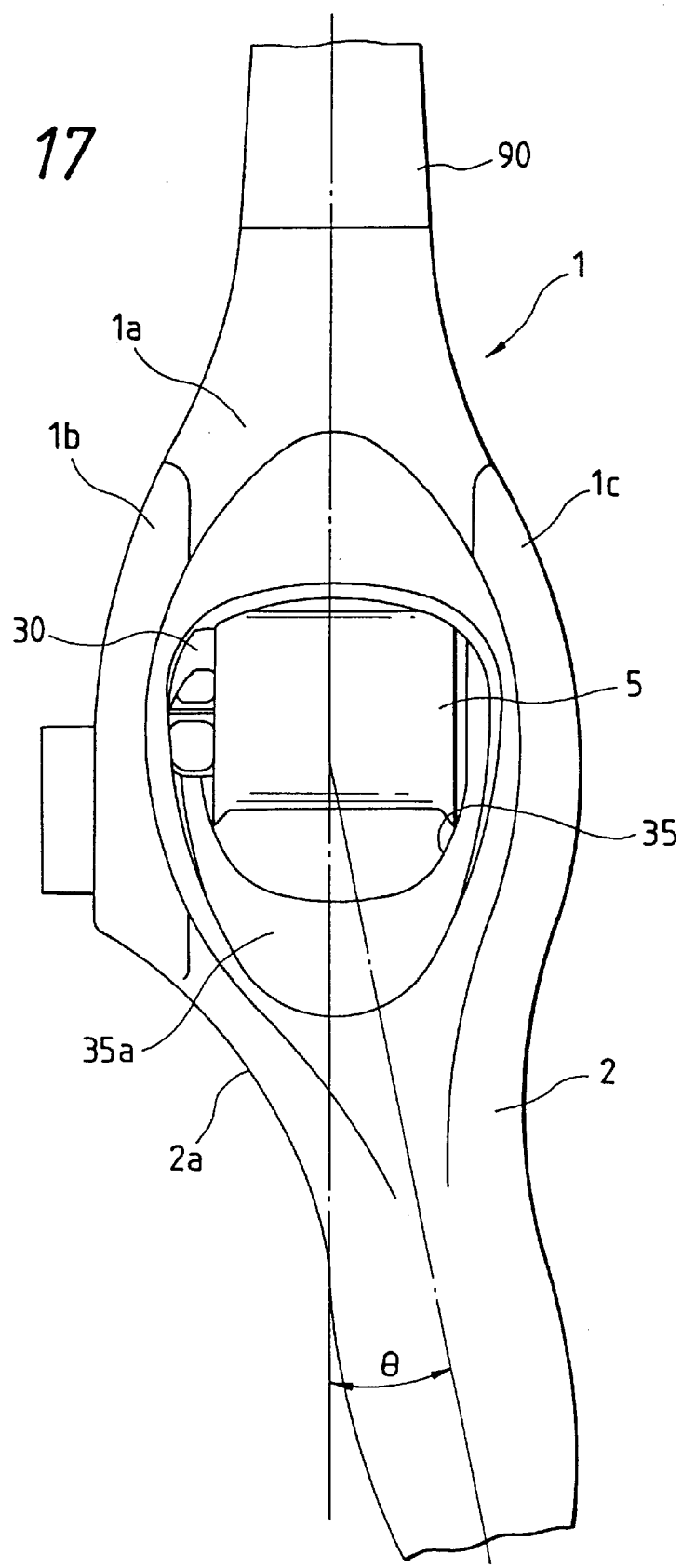
FIG. 17 is a diagram illustrative of a second modified example of the reel for fishing as shown in FIG. 15.
Figure 18:
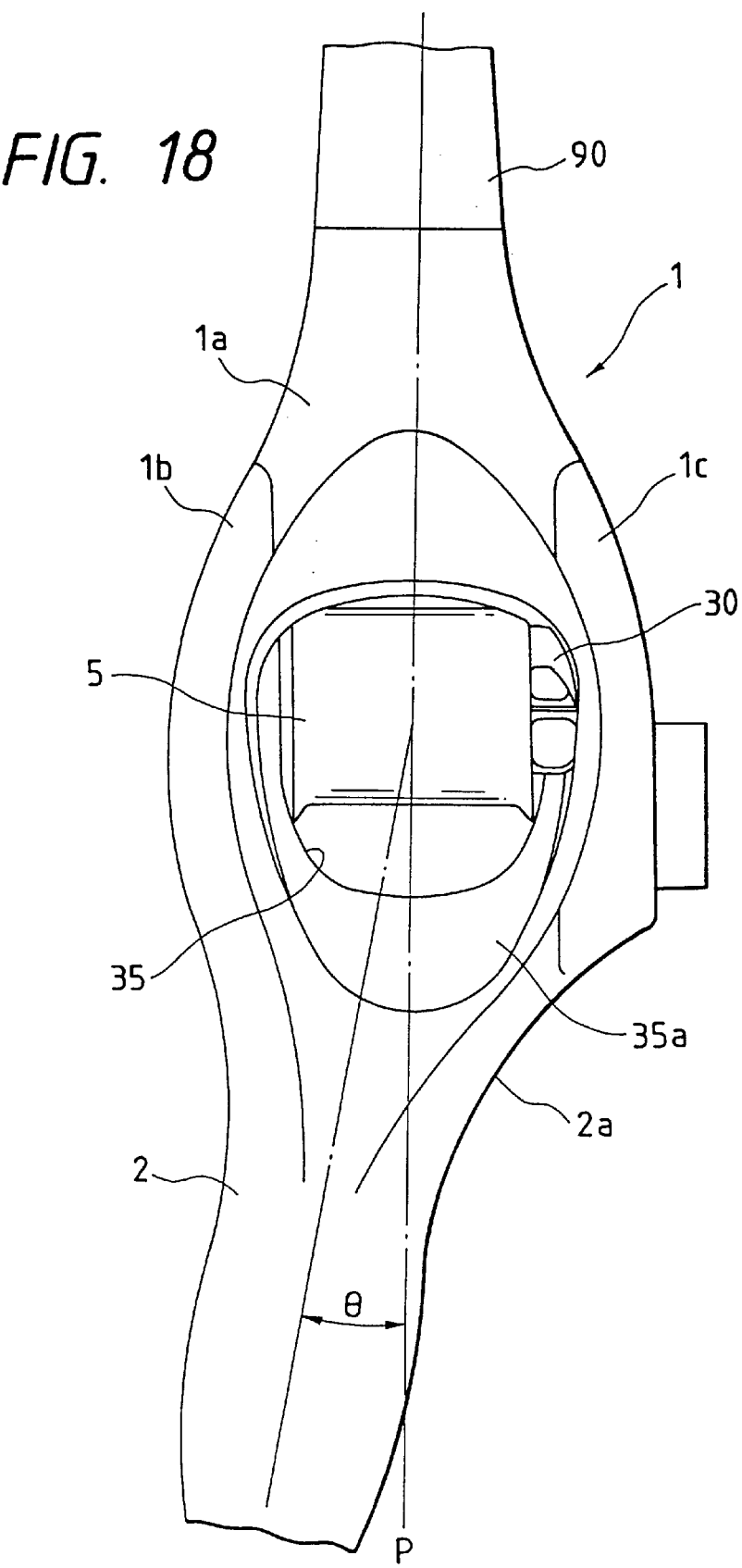
FIG. 18 is a diagram illustrative of a third modified example of the reel for fishing as shown in FIG. 15.

Like the first embodiment of the invention, this embodiment thereof may be varied diversely as shown in FIGS. 16–18.

In a modified example of FIG. 16, which is similar in arrangement to what is shown in FIG. 15, the handle is rotatable with the right hand. In modified examples of FIGS. 17–18, the shapes of the openings 25 are varied like those shown in FIGS. 13–14 in place of the arrangements shown in FIGS. 15–16. More specifically, though the openings 25 of FIGS. 15–16 have been formed along the direction in conformity with the direction of the thumb when the reel body 1 and the grip portion 2 are gripped and held, the openings 35 in these modified examples are formed laterally symmetrically with respect to the straight line P so as to make the whole spool wide open. Like the preceding embodiments of the invention, the digital pulp portion of the thumb is inevitably positioned in the central part of the spool 5 due to the arrangement of the grip portion 2, so that the shape of the opening may be varied diversely. Even in these modified examples, the tapered portion 35a tilting inward is preferably formed so as to make the digital pulp portion of the thumb easily contact the peripheral edge portion.

Figure 19:
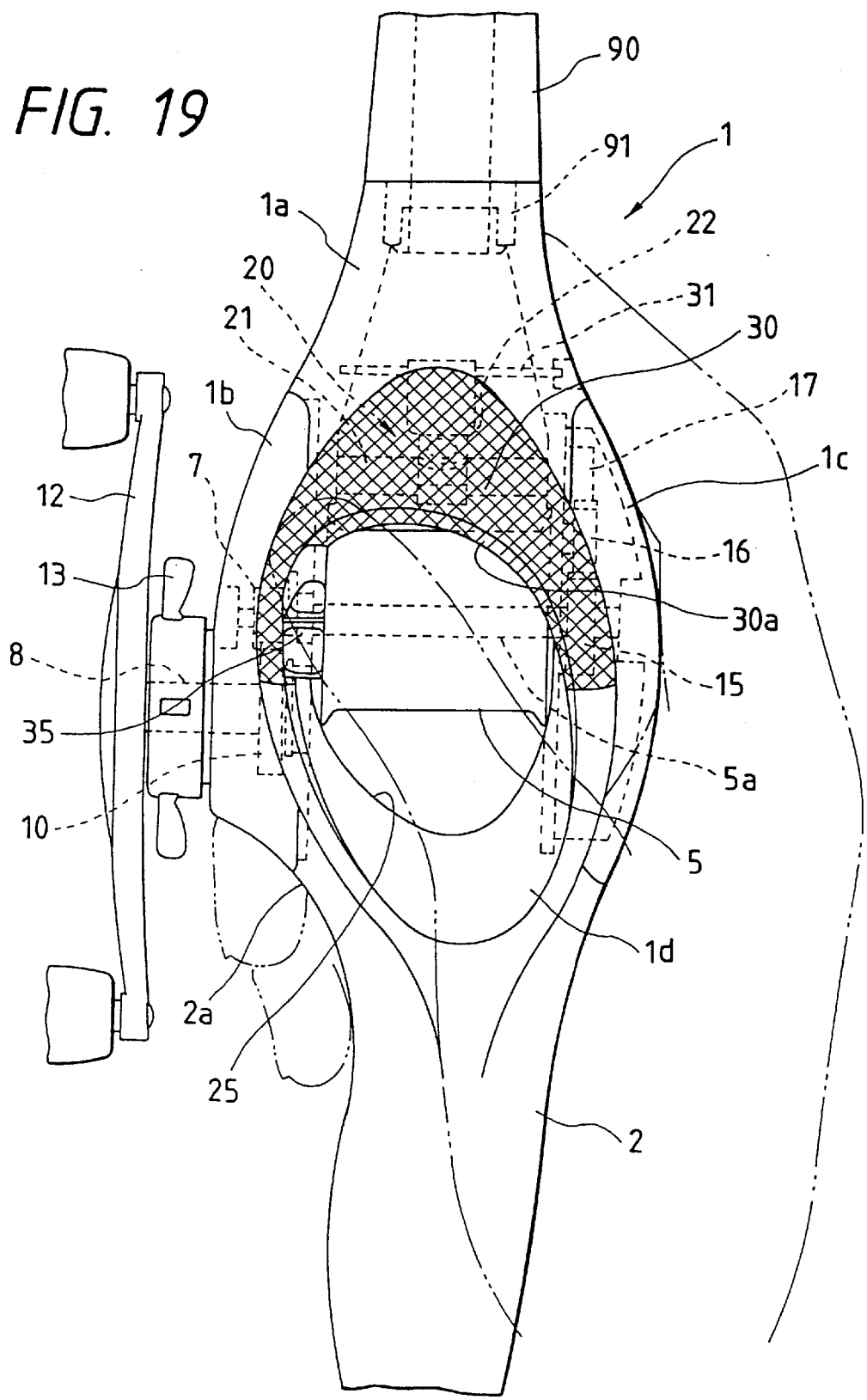
FIG. 19 is a plan view of a reel for fishing as a fourth embodiment of the invention illustrative of a state in which the reel has been mounted on a fishing rod.
Figure 20:
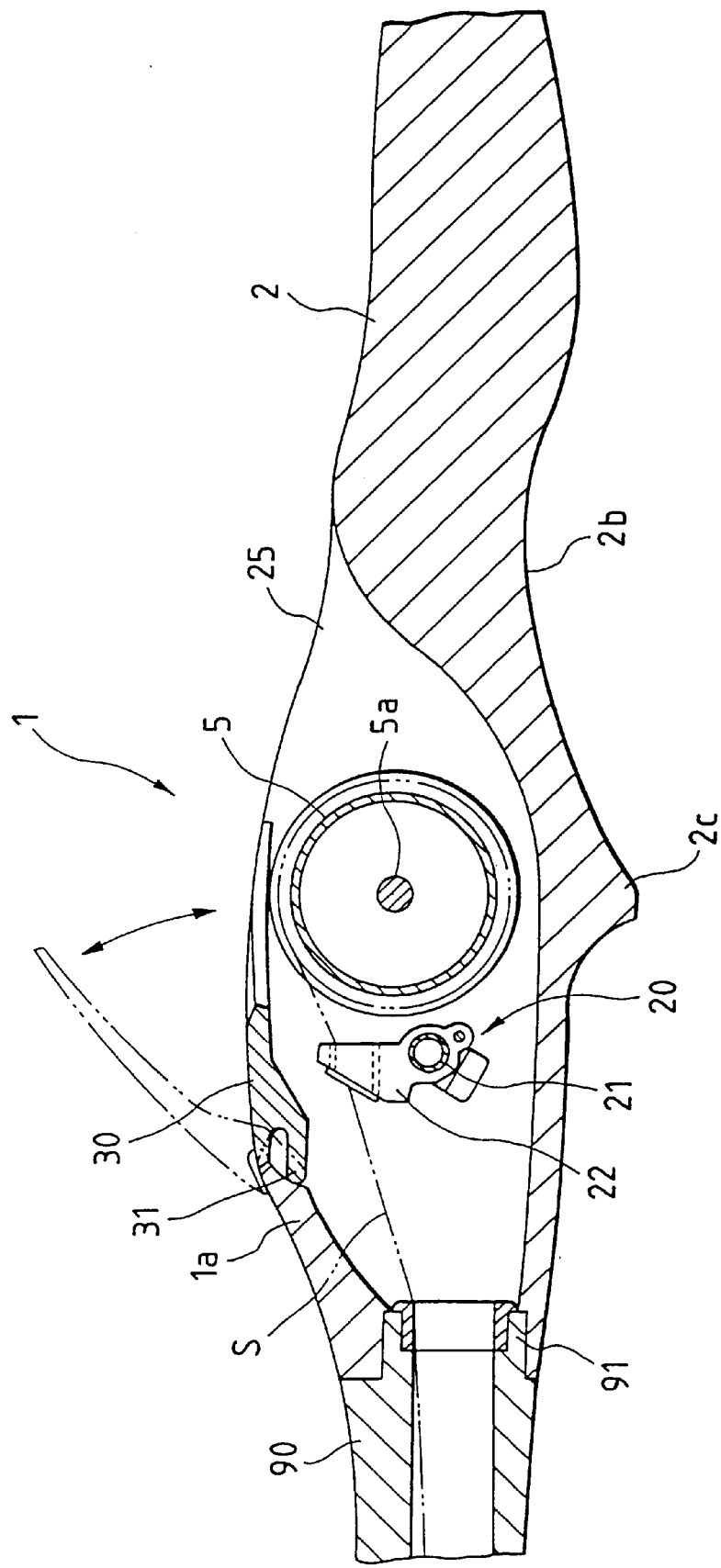
FIG. 20 is a vertical sectional view of the reel for fishing as shown in FIG. 19.

FIG. 19 is a plan view of a reel for fishing as a fourth embodiment of the invention illustrative of a state in which the reel has been mounted on a fishing rod. FIG. 20 is a vertical sectional view of the reel for fishing as shown in FIG. 19. In this modified example of the reel for fishing, the handle is rotatable with the left hand.

Although the shape of the opening 25 formed in the top surface of the reel body 1 is not specifically restrictive, it is, as shown in FIG. 19, preferably formed along the direction of the thumb of the hand gripping and holding the reel body 1 and the grip portion 2. More specifically, the thumb is tilted toward the handle side with respect to the direction in which the grip portion 2 is extended when the reel body 1 and the grip portion 2 are gripped and held positively. Therefore, the operation of thumbing the spool is made performable by tilting the opening 25 toward the handle side 12 along the direction of the thumb as a whole to ensure that the grip portion is gripped and held positively.

As shown by an arrow, the cover member 30 for regulating the front peripheral edge portion of the opening 25 is supported by a support shaft 31 stretched and supported by the frame 1a on the fishline-playing-out side of the opening 25 in the reel body 1 in such a way that the cover member 30 can be opened and closed. The cover member 30 is, as shown by slant lines, stretched between the left and right side plates 1b, 1c so that the thumb gripping and holding the reel body 1 and the grip portion 2 can be seated thereon. When the cover member 30 is opened, the front area of the spool 5 and the level wind unit 20 are made wide open.

Therefore, the thumb gripping and holding the reel body 1 and grip portion 2 is situated on the surface of the cover member 30, whereby fishing can be conducted with stability as the grip maintainability of the reel body 1 is improved. Moreover, the operation of passing the fishline through the fishing rod 90 and the process of dealing with a backlash are facilitated by opening the cover member 30. In this case, tapered portions 30a, 1d tilting inward are preferably formed in the peripheral edge portions of the cover member 30 for regulating the opening 25 and the frame 1a respectively so as to bring the digital pulp portion of the thumb into contact easily therewith.

The smooth recesses 2a, 2b which are recessed toward the central side in the width and height directions are preferably formed, as shown in FIG. 19, in the grip portion 2 to ensure that the third and little fingers gripping and holding the grip portion are retained thereby. Further, the protruded portion (trigger) 2c is preferably formed in the underside area ranging from the reel body 1 up to the grip portion 2 likewise to ensure that the middle finger gripping and holding the grip portion 2 is retained thereby.

The grip portion 2 may be set integral with the reel body 1 by offsetting it on the counter-handle side with respect to the central axial line of the fishing rod 90. With this arrangement, the digital pulp portion of the thumb is positioned in the central part of the spool 5 when the reel body 1 and the grip portion 2 are gripped and held naturally since the position of the hand actually gripping and holding the grip portion 2 is deflected to the counter-handle side. Therefore, the thumbing operation is easily performable with stability since the thumbing operation can be performed in the central part of the spool 5.

According to this embodiment of the invention, a clutch switching member 35 which can be slid longitudinally in parallel to the cover member 30 is disposed so that while the reel body 1 and the grip portion 2 are gripped and held, the clutch switching operation may be performed. In this case, the cover member 30 remains closed while it is elastically retained by or magnetically attracted to the reel body 1.

Figure 21:
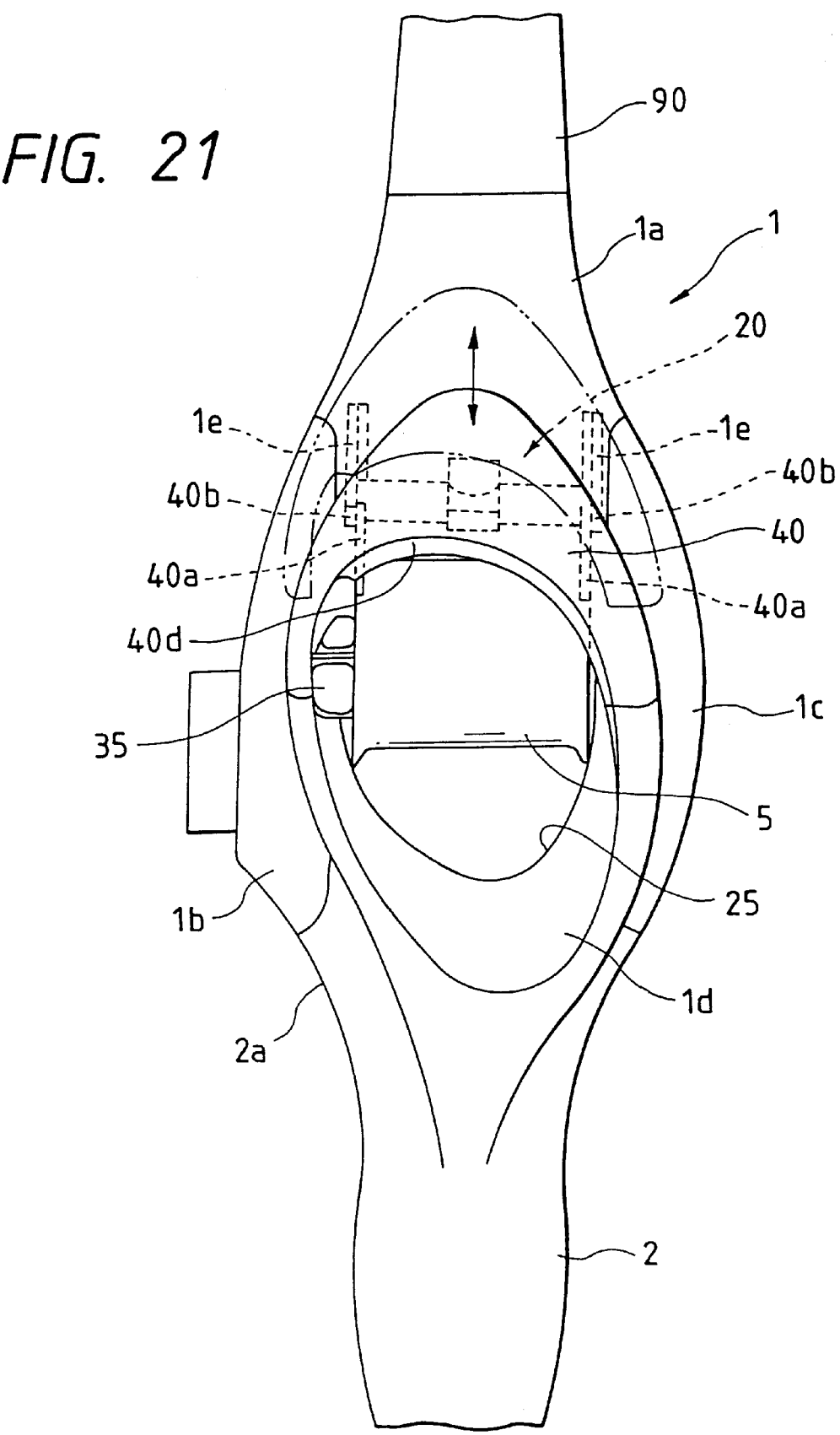
FIG. 21 is a plan view of a reel for fishing as a fifth embodiment of the invention illustrative of a state in which the reel has been mounted on a fishing rod.
Figure 22:
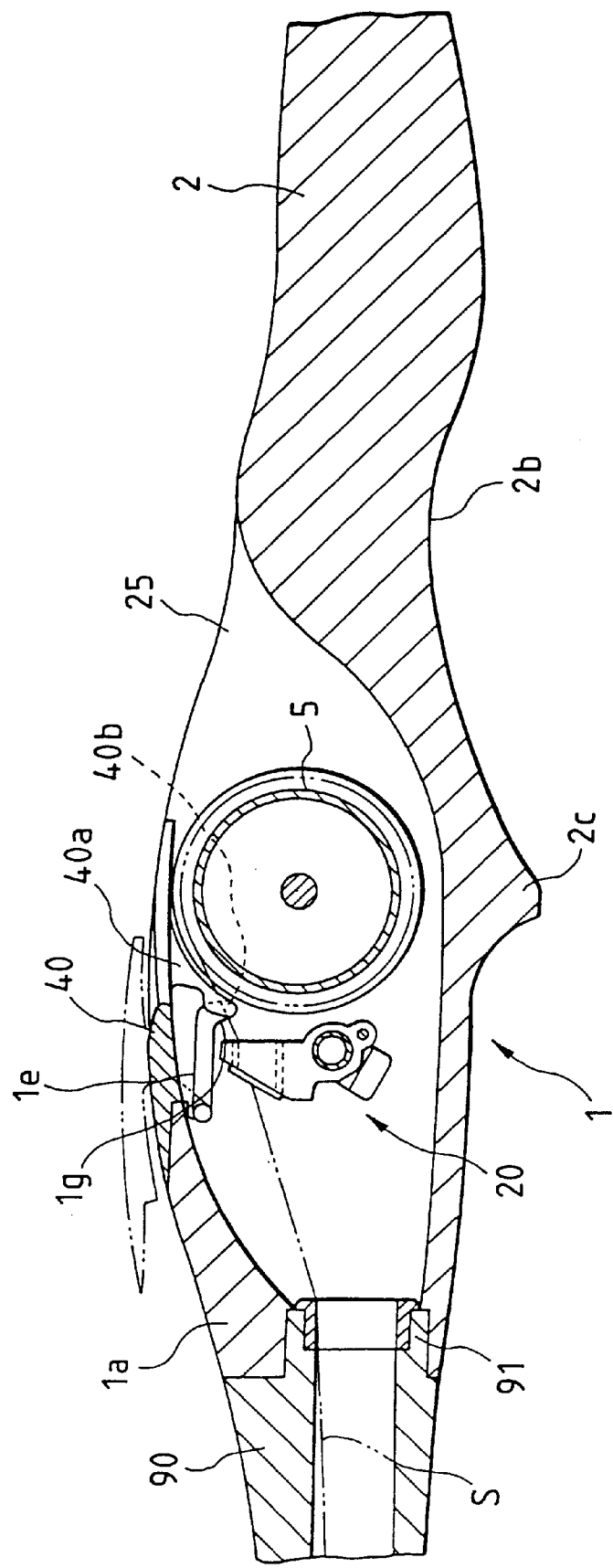
FIG. 22 is a vertical sectional view of the reel for fishing as shown in FIG. 22.

The cover member 30 is not restricted to the aforementioned arrangement but may be formed as shown in FIGS. 21–22.

As shown in these drawings, a guide groove 1e extending longitudinally is formed in the inner faces on both left and right sides of the frame 1a. Projections 40b projected from respective support arms 40a provided on both left and right sides of the cover member 40 and extended downward mate with the guide grooves 1e, whereby the cover member 40 can be opened and closed in the vertical direction as in the preceding embodiments of the invention and can also slidably be opened and closed in the longitudinal direction along the guide grooves 1e as shown by an arrow.

The rear portion of each guide groove 1e is preferably curved downward to prevent the cover member 40 from sliding because of the pressure applied by the thumb when the thumb is placed on the closed cover member 40. When such a curved portion 1g is formed, the cover member 40 is first opened upward and then slid in the forward direction. While the cover member 40 is closed, it is not allowed to slide forward because the projection 40b is brought into contact with the curved portion 1g. As in the preceding embodiments of the invention, moreover, a tapered portion 40d tilting inward is preferably formed on in the peripheral edge portion of the cover member 40 so as to make the digital pulp portion of the thumb easily touch that peripheral portion.

Since the cover member 40 can be opened and closed in not only the vertical direction but also the longitudinal direction according to this embodiment of the invention, it can be made wide open from the forepart of the spool 5 up to the level wind unit 20 and then the fishing rod fitting area, whereby the process of dealing with a backlash and the operation of passing the fishline through the fishing rod are performable more easily.

Figure 23:
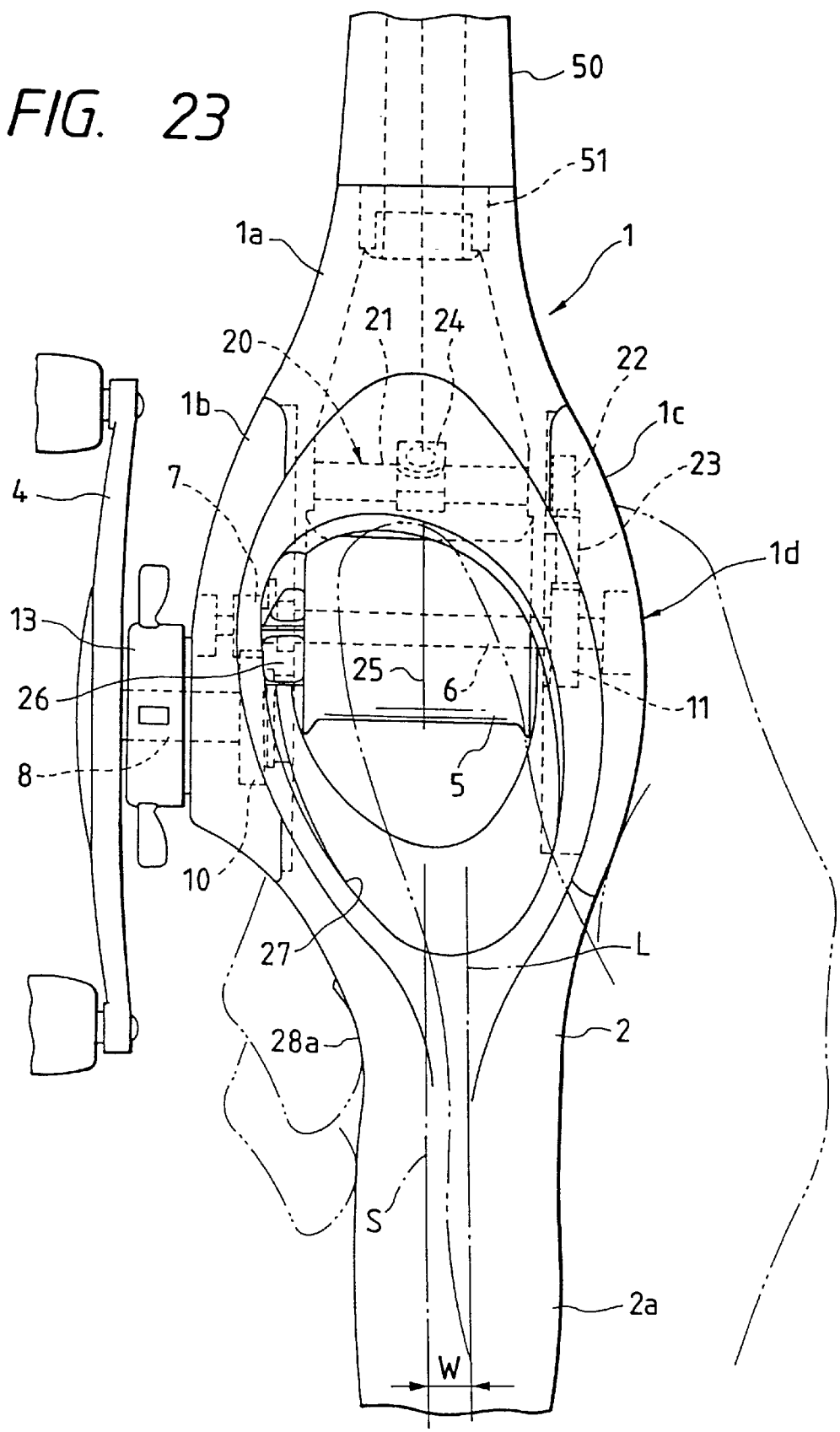
FIG. 23 is a plan view of a portion in the proximity of a reel for fishing as a sixth embodiment of the invention illustrative of a state in which the reel has been mounted in a fishing rod.
Figure 24:
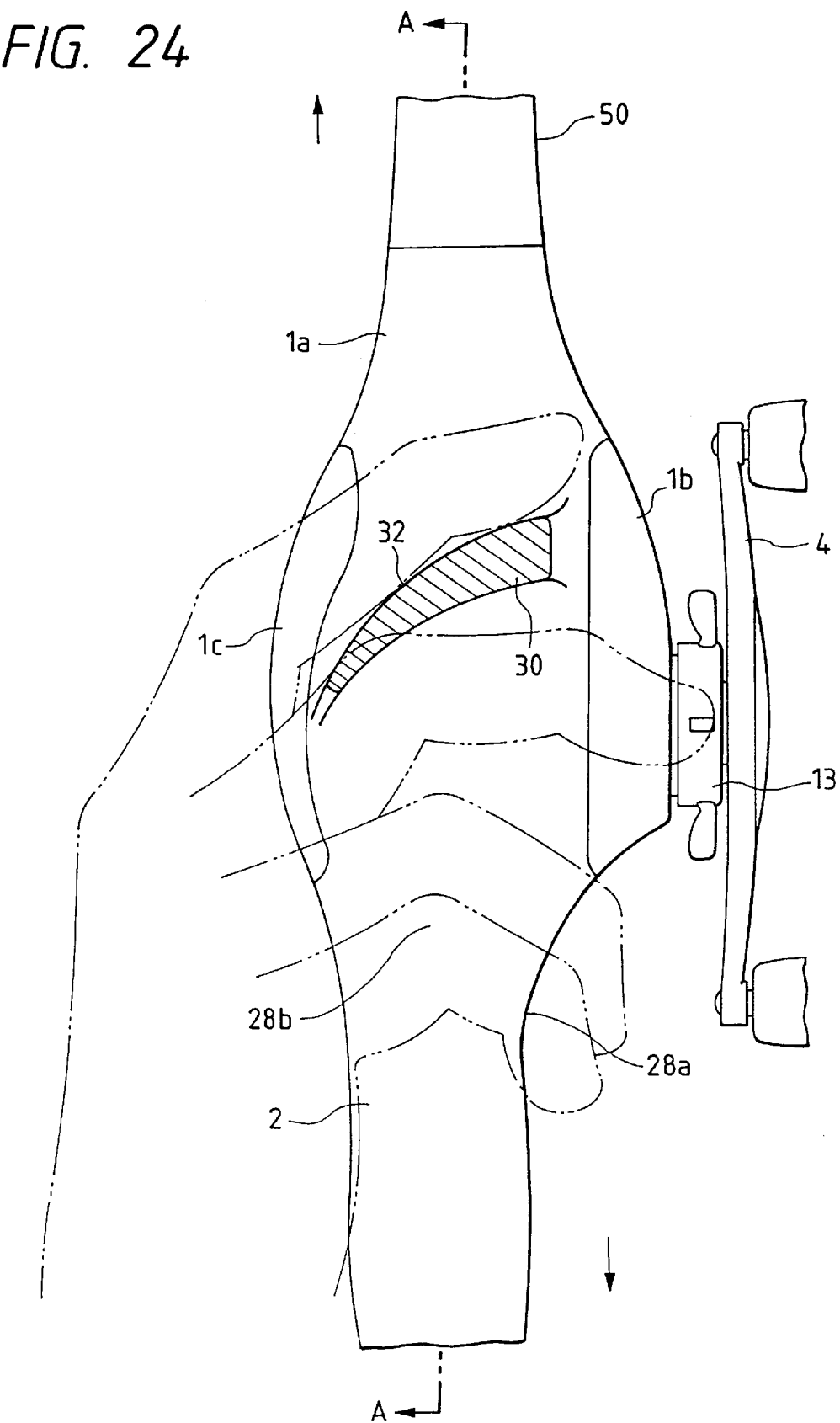
FIG. 24 is a bottom plan view of a portion in the proximity of the reel for fishing as the sixth embodiment of the invention illustrative of a state in which the reel has been mounted in the fishing rod.
Figure 25:
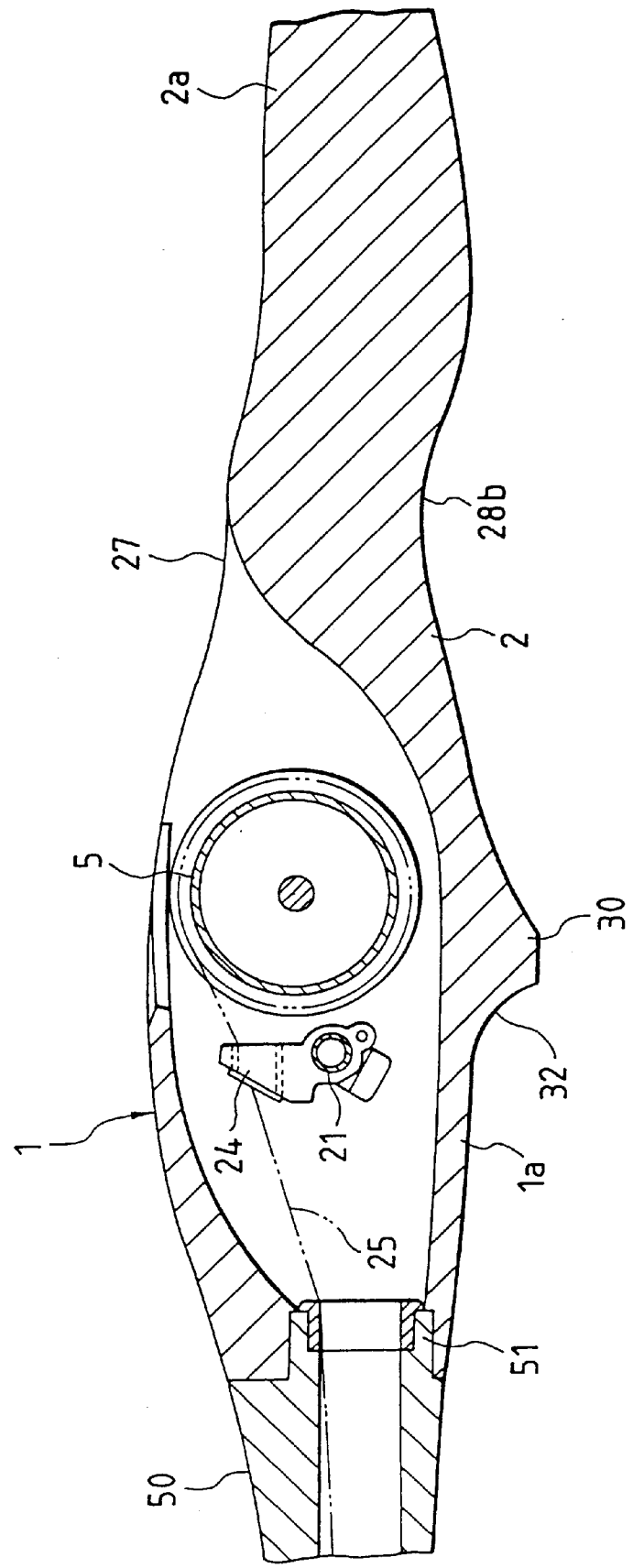
FIG. 25 is a vertical sectional view taken on line A—A of FIG. 24 in the proximity of the reel for fishing as the sixth embodiment of the invention illustrative of a state in which the reel has been mounted in the fishing rod.

A description will subsequently be given of a sixth embodiment of the invention by reference to FIGS. 23–25. In this embodiment of the invention, there is shown an example of a reel for fishing integral with a fishing rod, which has a built-in reel for fishing. FIG. 23 is a plan view of a portion in the proximity of a reel for fishing illustrative of a state in which the reel has been mounted in a fishing rod; FIG. 24 a bottom plan view of the portion in the proximity of the reel; and FIG. 25 a vertical sectional view of the reel for fishing.

A handle is rotatable with the left hand according to this embodiment of the invention.

In FIG. 23, reference numeral 1 denotes a reel body having the frame 1a, which is fitted with the left and right side plates 1b, 1c. The butt grip portion 51 of a fishing rod 50 is detachably screwed or fitted via a connection means into the leading end portion (in the direction in which a fishline is played out) of the reel body 1 or otherwise integrally bonded thereto. The outer surface of the reel body 1 is arranged so that the outer surface thereof is integrally connected to the outer surface of the fishing rod 50 and that the dimensions thereof in the height and width directions are gradually increased to form a smooth curved surface from an area where the fishing rod 50 is fitted in up to a spool supporting area and besides they are gradually decreased rearward also to form a smooth curved surface from the largest swelling (or bulge) portion so as to form an egg-shaped, that is, a substantially spherical shape. In other words, the reel body 1 forms an egg-shaped swelling (or bulge) portion 1d so sized that it can be gripped easily with one hand. The grip portion 2 is formed in an area where the above dimensions are gradually decreased rearward from the proximity of the spool supporting area, the grip portion 2 being gripped and held with one hand, that is, the grip portion 2 includes part of the reel body 1. The grip portion 2 is gripped and held with the thenar region and the little finger region of the palm and their fingers as shown by chain double-dashed lines of FIG. 23. A shaft-like rear grip portion 2a is continuously connected to the rear of the grip portion 2. The reel body 1, the grip portion 2 and the rear grip portion 2a are integrally formed.

The rear portion of the grip portion 2 and the central axial line L of the rear grip portion 2a are deflected by W toward the opposite side (counter-handle side) of a position where a handle 4 is installed with respect to the central position S in the lateral direction of the spool 5. In this case, the central position S in the lateral direction of the spool 5 as viewed from a plane conforms to the central axial line of the fishing rod 50. In other words, the digital pulp portion of the thumb shifts from the central portion of the spool 5 toward the handle side 4 when the reel body 1 and the grip portion 2 are gripped and held naturally with the grip portion 2 conforming to the central position S. However, the position of the digital pulp portion of the thumb can be positioned in the central part of the spool 5 by deflecting the grip portion 2 on the handle side as described above. Consequently, the operation of thumbing the spool 5 when the reel body 1 and the grip portion 2 are gripped and held naturally is easily performable with stability in the central region of the spool 5.

A spool shaft 6 fitted with the spool 5 is stretched between the left and right side plates 1b, 1c in the reel body 1 and rotatably supported via bearings (not shown). The pinion 7 is slidably and axially provided at one end of the spool shaft 6 and made to engage with the driving gear 10 mounted on the handle shaft 8. Consequently, the spool 5 is driven to rotate via the driving gear 10 and the pinion 7 by rotating the handle 4 mounted on the handle shaft 8.

In this case, the handle shaft 8 is fitted with a known drag mechanism (not shown), whereby drag regulation is made by rotating a brake regulating knob 13 mounted on the handle shaft 8 in the drag mechanism on the handle side 4.

A gear 11 is mounted on the other side of the spool shaft 6, and a gear 22 fitted with the traverse shaft 21 of the level wind unit 20 is made to engage with the gear 11 via an intermediate gear 23. A line guide 24 engaging with the traverse shaft 21 is made to reciprocate between the left and right side plates 1b, 1c as the gear 22 rotates. A fishline 25 wound on the spool 5 is passed via the line guide 24 through the fishing rod 50. When the handle 4 is rotated in the winding-up direction, the line guide 24 of the level wind unit 20 is laterally reciprocated via the gears 11, 23, 22 and the traverse shaft 21 together with the winding-up rotation of the spool 5, whereby the fishline 25 is wound up in parallel to the spool 5.

A known clutch mechanism (not shown) is made to engage with the pinion 7 mounted on the spool shaft 6. The clutch mechanism transmits torque from the handle 4 by axially sliding the pinion 7 (clutch ON: fishline winding-up state) or otherwise cuts off the torque transmission (clutch OFF: fishline playing-out state) and the switching operation is performed by operating a clutch switching member 26.

An opening 27 capable of receiving the thumb in position is formed in the top surface of the swelling portion 1d of the reel body 1 so as to make possible the operation of thumbing the spool 5 when the reel body 1 and the grip portion 2 are integrally gripped and held at the time of actual fishing. This thumbing operation is performed by pressing the digital pulp portion of the thumb of the hand naturally gripping the grip portion 2 against the spool 5 via the opening 27.

The opening 27 in the top surface of the reel body 1 is preferably formed along the direction of the thumb of the hand when the reel body 1 and the grip portion 2 are gripped and held as shown in FIG. 1. In other words, if the reel body 1 and the grip portion 2 are gripped and held positively, the thumb is situated in a direction tilting toward the handle side 4 with respect to the direction in which the grip portion 2 is extended. Therefore, the operation of thumbing the spool is made performable by tilting the opening 27 toward the handle side 4 along the direction of the thumb with respect to a straight line S to ensure that the grip portion is gripped and held positively.

With the arrangement above, the thumbing operation at the time of actual fishing is performable in the central part of the spool 5 to ensure that the grip portion is gripped and held naturally. Smooth recesses 28a, 28b which are recessed toward the central side in the width and height directions are preferably formed, as shown in FIG. 10, in the grip portion 2 to ensure that the third and little fingers gripping and holding the grip portion are retained thereby.

On the other hand, a wide finger hooking portion (trigger) 30 capable of retaining the digital pulp portion of a finger of the hand of an adult, the finger, particularly the index finger, holding the grip portion 2, is formed in the gripping area on the undersurface of the grip portion 2 of the reel body 1. The finger hooking portion is in the form of a ridge with one streak of protrusion protruding along the ridge. The ridge of the finger hooking portion is, as shown in FIG. 2, such that one end on the handle side is deflected to the tip of the fishing rod (forward) and that the end on the counter-handle side is deflected to the butt cap side (rearward) and tilted. Moreover, a finger hooking portion 32 is also tilted as will be described later. The sectional view of the finger hooking portion 30 is shaped like a mountain as shown in FIG. 25. Further, a finger hooking surface 32 formed with the front upright wall surface of the finger hooking portion 30 is, as shown in FIG. 24, formed wide enough to be able to face the whole length of the digital pulp portion of the index finger ranging from the distal phalanx up to the middle phalanx and including both of them. When the three finger joints of the index finger are called a first, a second and a third finger joint from the digital pulp portion, the creeping width (length) of the finger hooking surface 32 of the finger hooking portion 30 along its ridge is set so that the digital pulp portion on the finger tip side from the second finger joint is brought into contact with and retained by the ridge-like finger hooking portion 30 along the direction of the ridge. The finger hooking portion 30 is in the form of a wide ridge along the undersurface of the reel body 1 in that the index finger is retained by the long area of the finger hooking surface 32 of the finger hooking portion 30.

The creeping length of the finger hooking surface 32 of the finger hooking portion 30 may be set great enough for the finger portion on the finger tip side from the second finger joint to be retain by the finger hooking surface 32 or greater. However, the finger hooking surface 32 is not necessarily needed to be set wider than the reel body 1. It is only required to set the creeping width of the finger hooking surface 32 as great as at least the central portions of both the distal and middle phalanxes are retainable. In this case, the creeping width of the finger hooking surface 32 of the finger hooking portion 30 is ⅓ of the lateral width of the reel body 1 and preferably greater than ⅓ but does not exceed the lateral width of the reel body 1, which is sufficient.

A specific example of the creeping width of the finger hooking surface 32 of the finger hooking portion 30 is 1.5 cm or greater, preferably 2 cm or greater, more preferably 2.5 cm or greater and further desirably 3 cm or greater. According to the embodiment of the invention in reference to FIG. 2, the width is set to 3 cm or greater.

Since the finger hooking surface 32 with which the digital pulp portion of the index finger utilizes the width of the swelling portion 1d of the reel body 1, a long wide ridge-like finger hooking surface 32 along the longitudinal direction of the index finger can readily be formed. Since the reel body 1 is formed with the frame 1a and the left and right side plates 1b, 1c, the finger hooking surface 32 is provided so that it is tilted over the full lateral width of the undersurface of the frame 1a. Needless to say, the finger hooking surface 32 may be formed over the full lateral width of the under-surface including the frame 1a and the left and right side plates 1b, 1c.

In order for the index finger to be retained tightly and widely by the finger hooking portion 30, further, the finger hooking surface 32 has an intermediate portion which is curved in that it is swelled in an arcuate shape on the tip side of the fishing rod. The finger hooking surface 32 of the finger hooking portion 30 in cross section is recessed in an arcuate shape so that the index finger fits to the surface as shown in FIG. 25.

The fishing operating using the fishing rod incorporating the reel for fishing will subsequently be described. First, terminal tackles are cast through the casting operation by gripping the grip portion 2 with the right hand and turning off the clutch switching member 26.

During the operation above, the grip portion 2 including the reel body 1 can be gripped naturally. The third and little fingers are retained by the recesses 28a, 28b and almost whole portion of the index finger from at least the second finger joint on the finger tip side is brought into contact with and retained by the finger hooking portion 30 to ensure that the grip portion 2 including the reel body 1 is gripped and held without any backlash. Therefore, the casting operation and the like are performable with stability. The grip portion 2 can be gripped naturally with a sense of unity particularly because the digital pulp portion of the index finger ranging from the distal phalanx over the middle phalanx is widely retained by the finger hooking portion 30.

Therefore, the grip maintainability of the reel body 1 is increased and the fishing rod 50 is set free from reeling and shifting around the shaft thereof. The angler will hardly feel tired by fishing for hours because the grip maintainability is secured even though he keeps gripping the grip portion lightly. Moreover, the angler will never suffer from finger-ache as the gripping force is prevented from locally centering on each gripping-holding finger and particularly on the index finger.

As set forth above, the reel body 1 and the grip portion 2 are gripped positively to ensure that a stable casting operation is performable. The thumbing operation for applying brake to the spool 5 by the thumb is performed in the positive holding state during the casting operation and since the digital pulp portion of the thumb is surely brought into contact with the central area of the spool 5, the delicate operation of thumbing the spool 5 is simply performable. As the opening 27 is shaped along the direction in conformity with the direction of the thumb, further, it gives support to the gripping conditions of the reel body 1 and the grip portion 2 during the casting operation and increases the maintenance of stability.

When the retrieve operation is performed after the terminal tackles have landed on the water, the gripping conditions can easily be maintained without failure. Further, the clutch switching member 26 is turned on by means of the thumb and the handle 4 is rotated in the winding-up direction. The thumbing operation even during the winding-up operation allows the digital pulp portion of the thumb to be kept in contact with the central area of the spool 5, whereby the delicate thumbing operation is easily performable. Due to the grip maintainability with stability even though the reel body 1 and the grip portion 2 are gripped with ease, strike sensitivity is improved.

Figure 26:
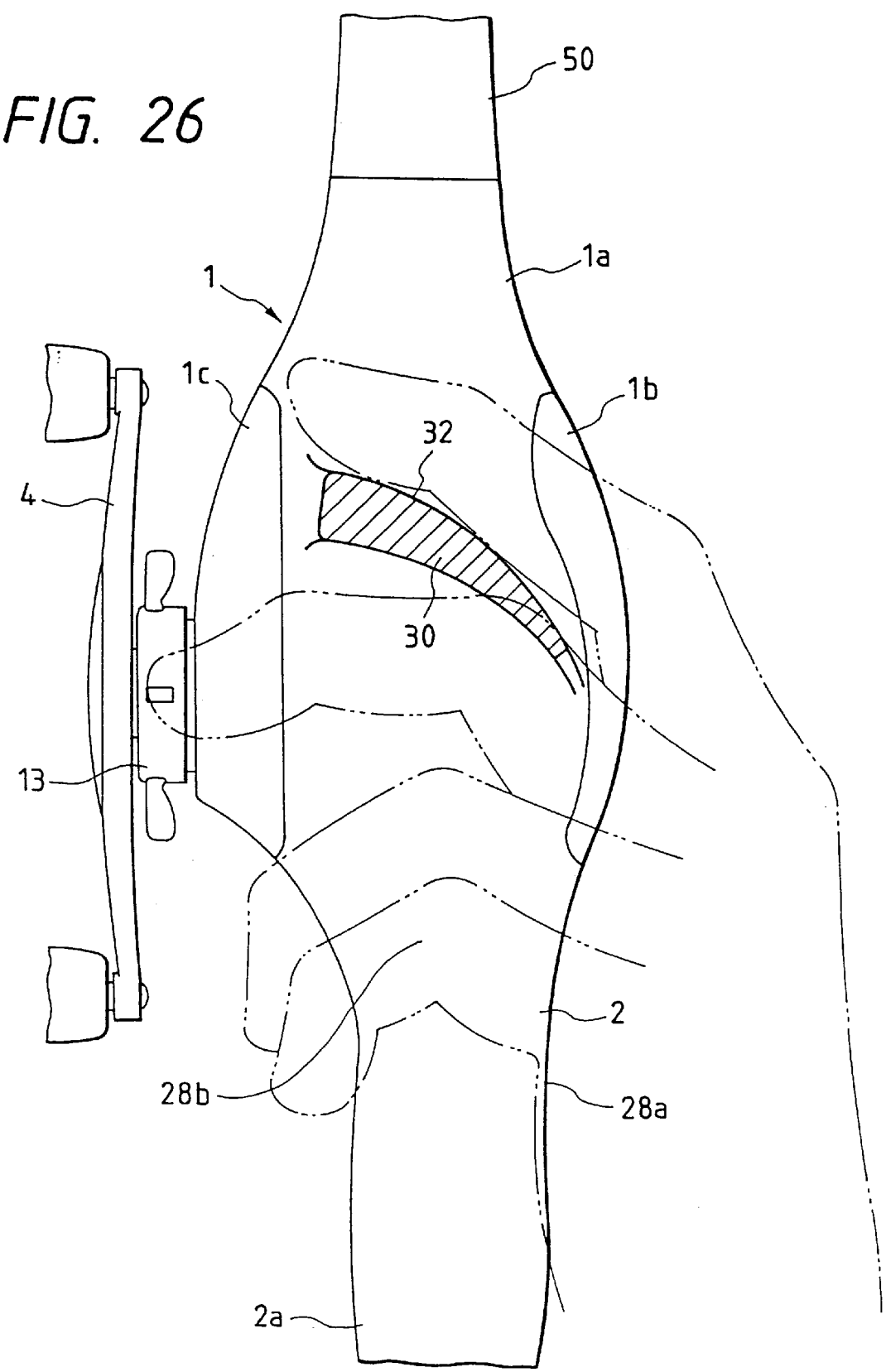
FIG. 26 is a bottom plan view of a portion in the proximity of a reel for fishing as a seventh embodiment of the invention illustrative of a state in which the reel has been mounted in a fishing rod.

FIG. 26 shows a seventh embodiment of the invention with the handle rotatable with the right hand. As this embodiment of the invention is similar in arrangement to the above-described sixth embodiment thereof except for the arrangement of rotating the handle with the right hand, like reference characters designate like component members.

Figure 27:
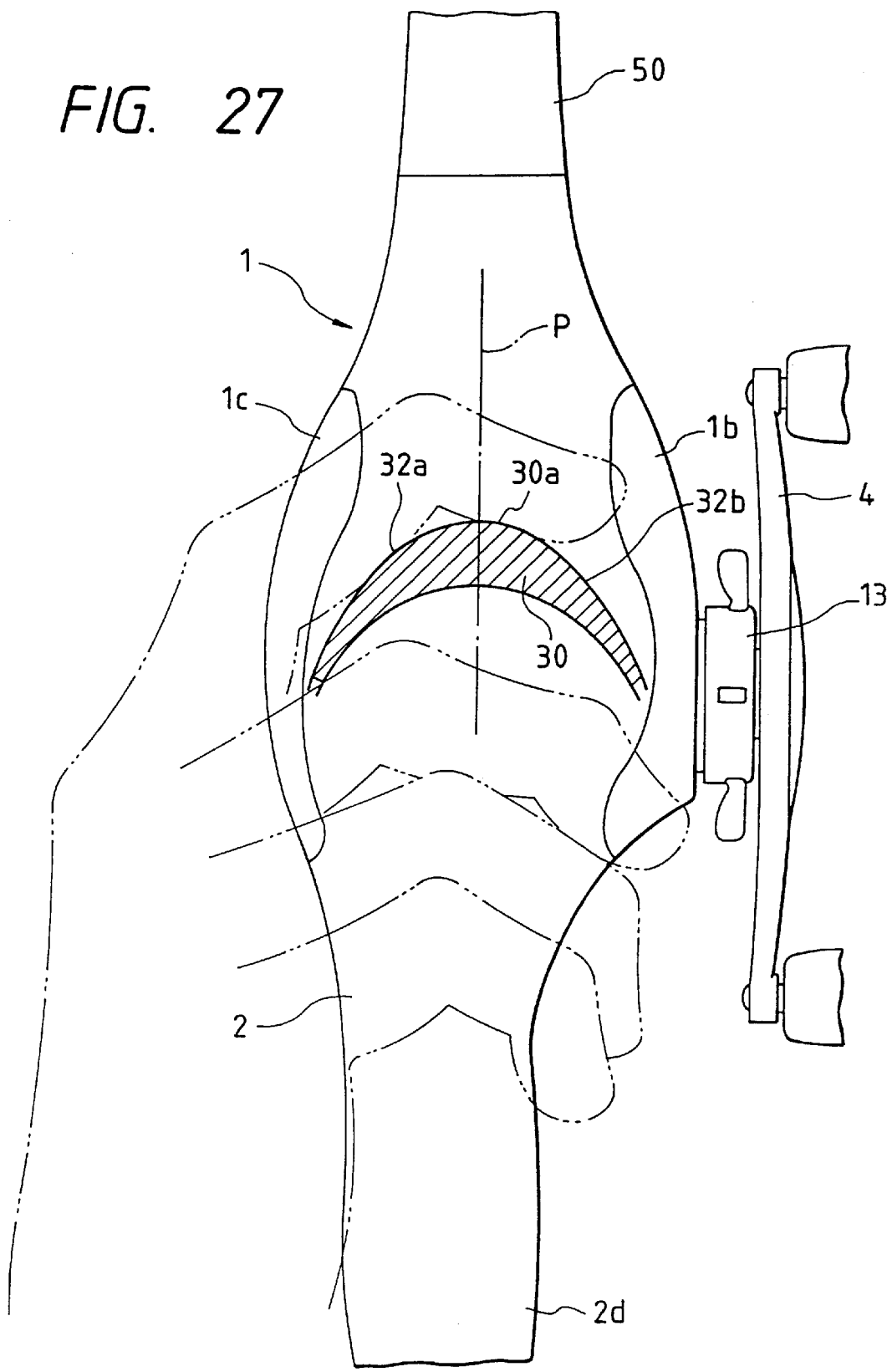
FIG. 27 is a bottom plan view of a portion in the proximity of a reel for fishing as an eighth embodiment of the invention illustrative of a state in which the reel has been mounted in a fishing rod.

FIG. 27 shows an eighth embodiment of the invention wherein a modified example of the arrangement of the finger hooking portion 30 is described. As shown in FIG. 27, there is formed an inverted U-shaped finger hooking portion 30 swelling with roundness toward the rod tip side in lateral symmetry around the center line P of the reel body 1 in the underside area thereof. According to this embodiment of the invention, a right-hand and a left-hand side finger hooking surface 32a, 32b are continuously formed. The digital pulp portion of the distal phalanx portion of the index finger is brought into contact with the proximity of a curved portion 30a at the apex of the finger hooking portion 30, so that the index finger of the hand gripping the reel body is strongly retained. Moreover, it is intended to freely shift the grip portion from one hand to the other because the reel body can be gripped with the left or right hand.

Figure 28:
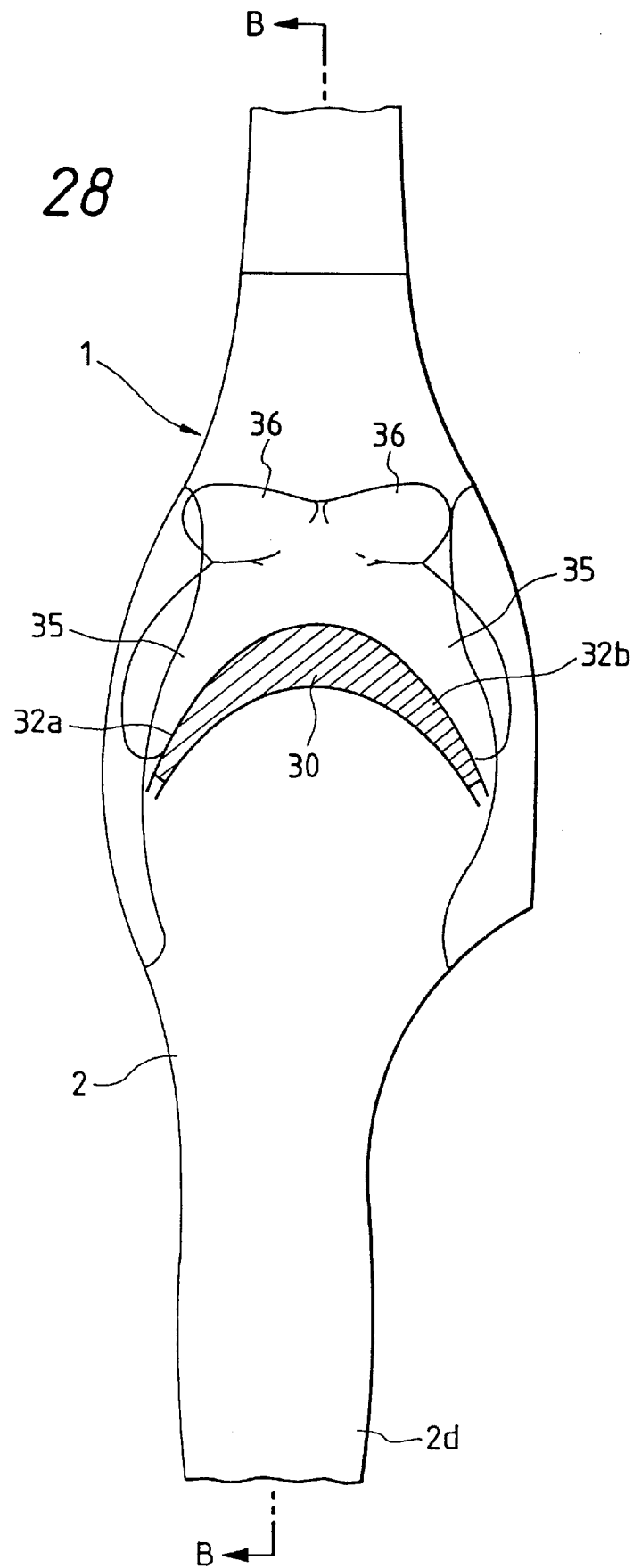
FIG. 28 is a bottom plan view of a portion in the proximity of a reel for fishing as a ninth embodiment of the invention illustrative of a state in which the reel has been mounted in a fishing rod.
Figure 29:
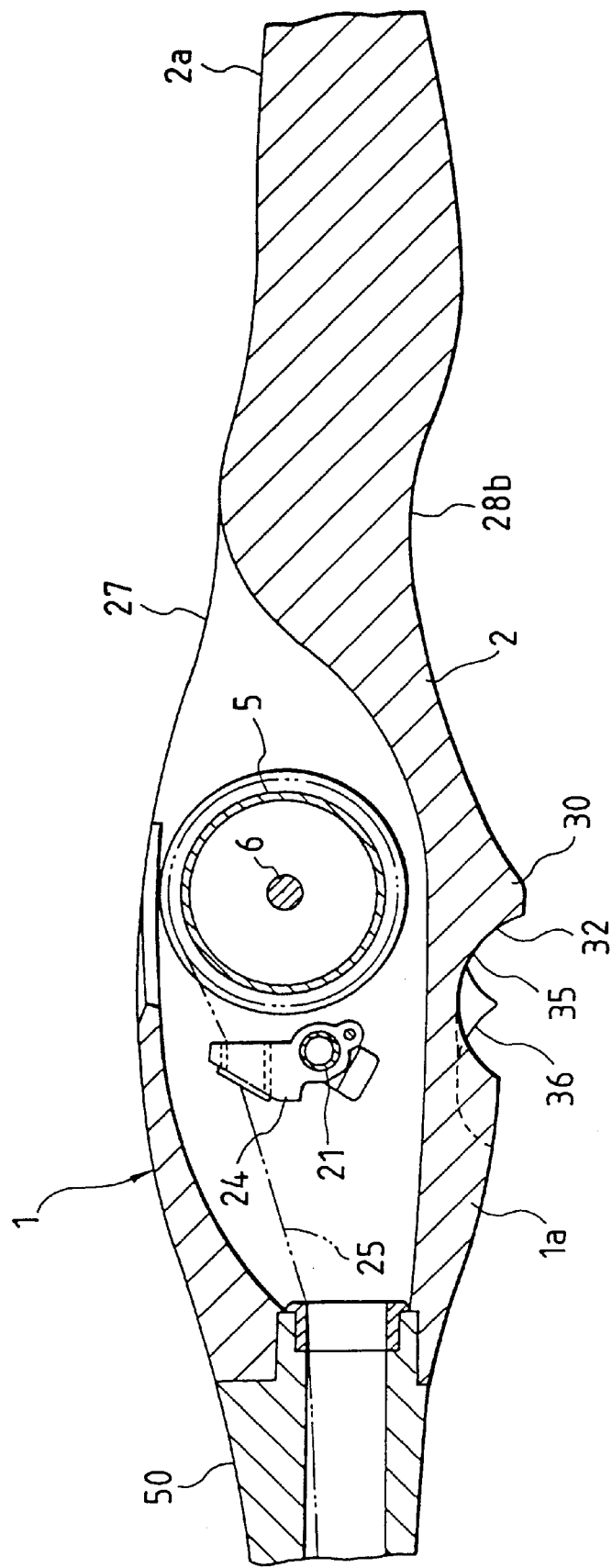
FIG. 29 is a sectional view taken on line B—B of FIG. 28 in the proximity of the reel for fishing as the ninth embodiment of the invention illustrative of a state in which the reel has been mounted in the fishing rod.

FIGS. 28–29 show a ninth embodiment of the invention as a modified example of the preceding eighth embodiment thereof wherein groove-like recesses 35 are bored in the front undersides of the right and left finger hooking surfaces 32a, 32b of the finger hooking portion 30 to make the finger retained by the finger hooking portion 30 fit into the recess. The right and left recesses 35 communicate with each other as both intersect in the central part. An extended portion 36 for allowing the straightened finger to escape is continuously formed in the finger tip side portion of each recess 35.

According to this embodiment of the invention, the index finger is prevented from shifting from the finger hooking portion 30 since the index finger retained by the finger hooking portion 30 fits in the groove-like recesses 35 for positioning purposes and the stability of the gripping operation is increased accordingly. Even though the height of the finger hooking portion 30 from the outer surface of the reel body 1 is suppressed, the height of the finger hooking surface 32 is substantially secured. Therefore, the swelling portion of the reel body 1 can be formed into a smooth and substantially spherical outer shape on the whole as shown in FIG. 29.

Even according to this embodiment of the invention, the finger hooking portion 30 appears to be ridge-shaped with the finger hooking surface 32. Further, the inner face of the hole may be used to form the finger hooking surface of a ridge-like finger hooking portion instead of the hole as the recess 35 into which the finger can be inserted.

FIG. 30 shows a tenth embodiment of the invention wherein the finger hooking portion 30 is formed of a member different from the body member of the grip portion 2 and detachably mounted on the body member of the grip portion 2. As shown in FIG. 30(a), there are formed, in the undersurface of the body member 40 of the grip portion 2, a relatively shallow first groove portion 42 into which the base of the member 41 of the finger hooking portion 30 is tightly fitted, and a second groove portion 44 which is formed in the center of the first groove portion 42 and into which a projection 45 projecting from the center of the undersurface of the base of the member 41. Further, a setscrew 43 is passed through the body member 40 of the grip portion 2 from inside and screwed into the portion of the projection 43 to fix the member 41 of the finger hooking portion 30. When the setscrew 45 is loosened, the member 41 of the finger hooking portion 30 is removable.

As shown in FIGS. 30(b)–30(c), a plurality of members 41 of the finger hooking portion 30 different in height and shape are prepared so that they are selectively mountable.

Those shown in FIGS. 30(b)–30(c) are different in height and shape, and what is shown in FIG. 30(d) has its surface coated with a coating member 46 of soft material.

According to this embodiment of the invention, the member 41 of the finger hooking portion 30 is properly selected and mounted for use, depending on the size of the user's hand and his liking. Moreover, members to be gripped with the right and left hands may be prepared and mounted, depending on the characteristic of the user. In this case, both right- and left-handed persons can be dealt with by changing only the member 41 of the finger hooking portion 30.

Figure 31:
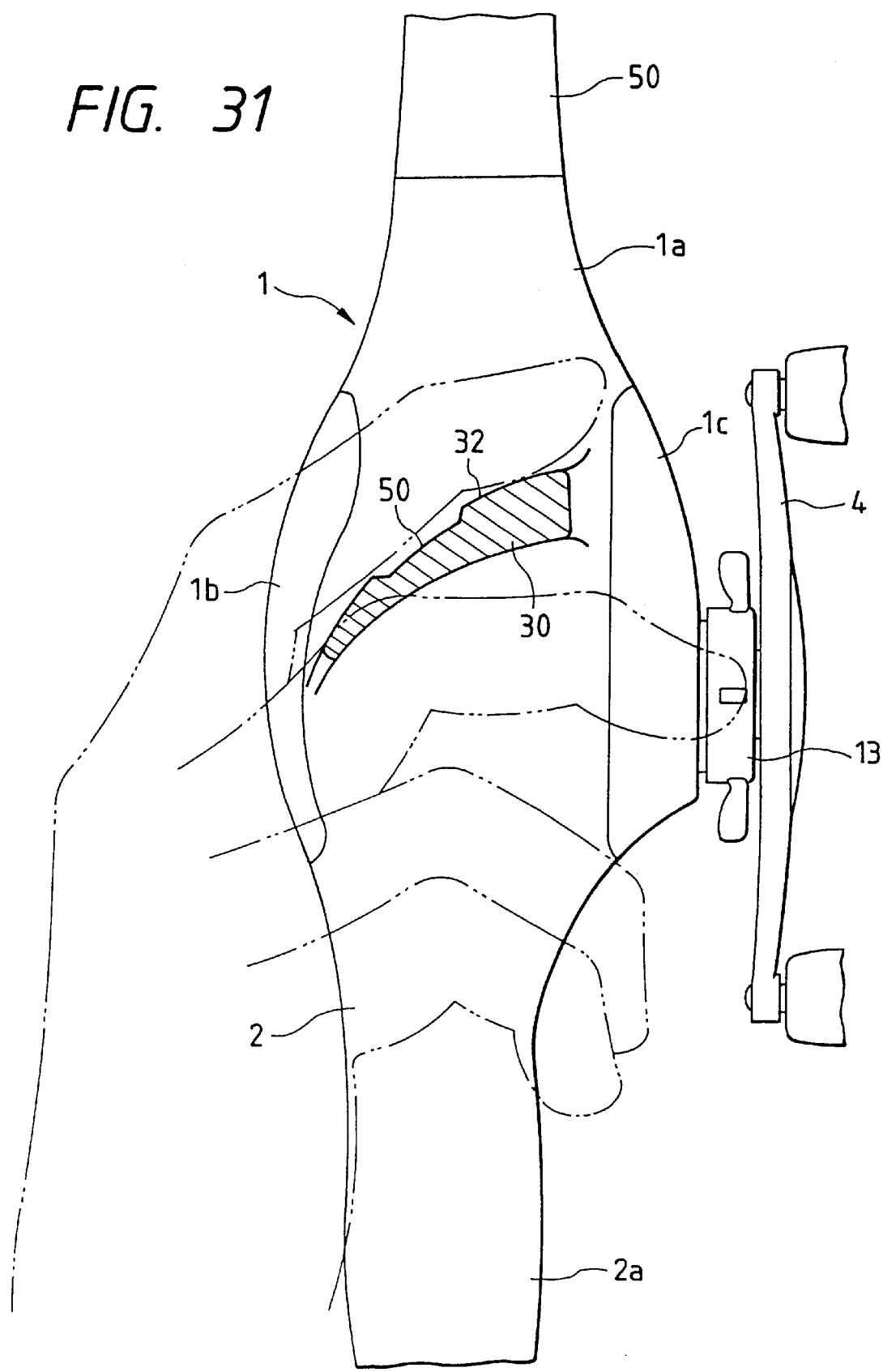
FIG. 31 is a bottom plan view of a portion in the proximity of a reel for fishing as an eleventh embodiment of the invention illustrative of a state in which the reel has been mounted in a fishing rod.

FIG. 31 shows an eleventh embodiment of the invention wherein one recess 50 is formed in the finger hooking surface 32 of the finger hooking portion 30 according to the sixth embodiment of the invention, which recess is positioned in the central part in the longitudinal direction. The recess 50 prevents the finger retained by the finger hooking portion 30 from slipping off.

Figure 32:
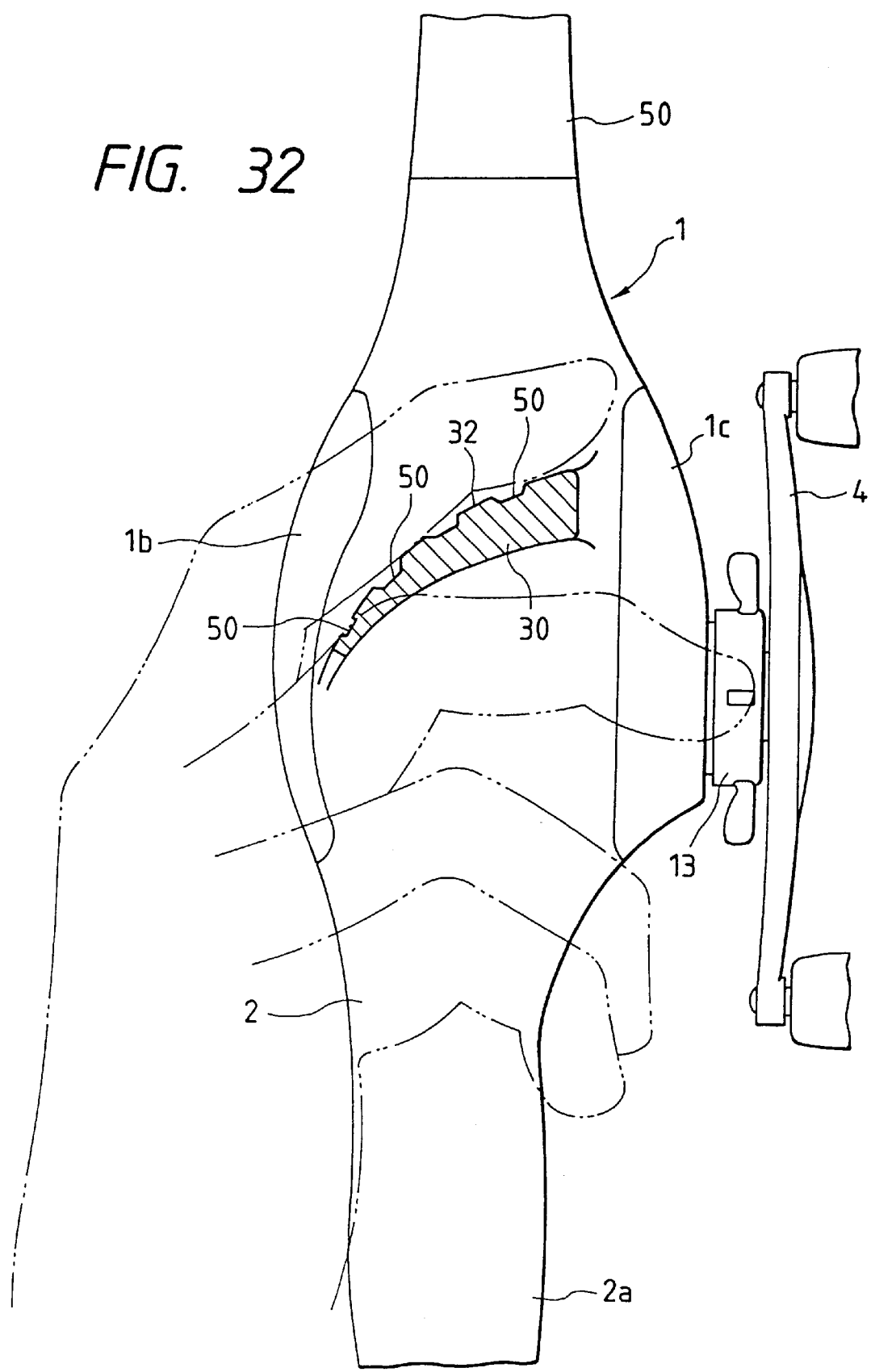
FIG. 32 is a bottom plan view of a portion in the proximity of a reel for fishing as a twelfth embodiment of the invention illustrative of a state in which the reel has been mounted in a fishing rod.

FIG. 32 shows a twelfth embodiment of the invention as a modified example of the eleventh embodiment thereof, wherein a plurality of slip-preventive recesses 50 are formed. Each recess 50 is relatively shallow and the recesses are disposed at equal intervals. This embodiment of the invention is more effective in preventing the finger from slipping off than the preceding embodiment thereof.

Figure 33:
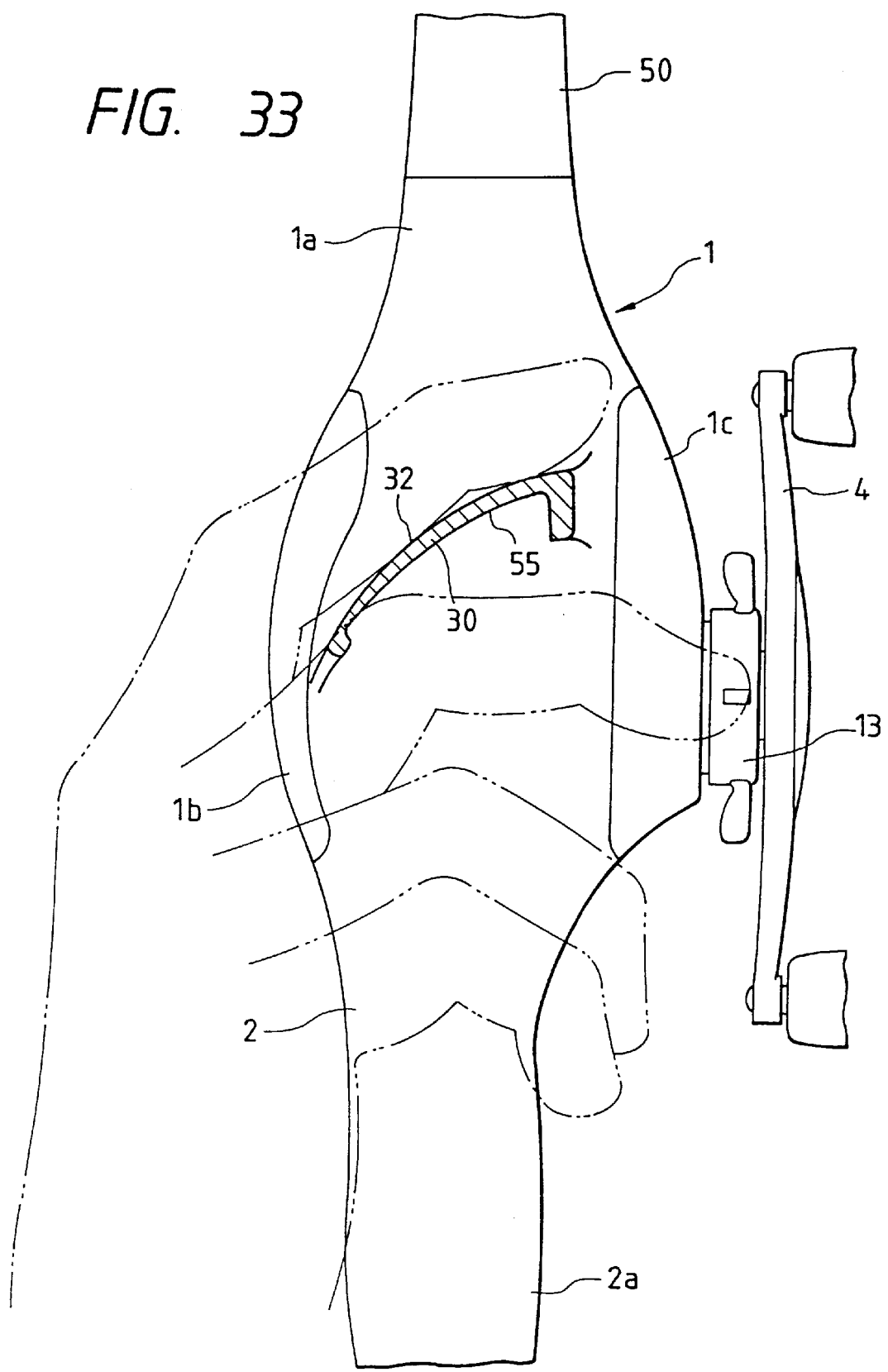
FIG. 33 is a bottom plan view of a portion in the proximity of a reel for fishing as a thirteenth embodiment of the invention illustrative of a state in which the reel has been mounted in a fishing rod.

FIG. 33 shows a thirteenth embodiment of the invention wherein a recess 55 is formed in the rear wall of the finger hooking portion 30 in the above-described sixth embodiment thereof and the thickness of the wall of the finger hooking portion 30 is increased. According to this embodiment of the invention, the grip portion 2 including the reel body 1 can be made lightweight.

Figure 34:
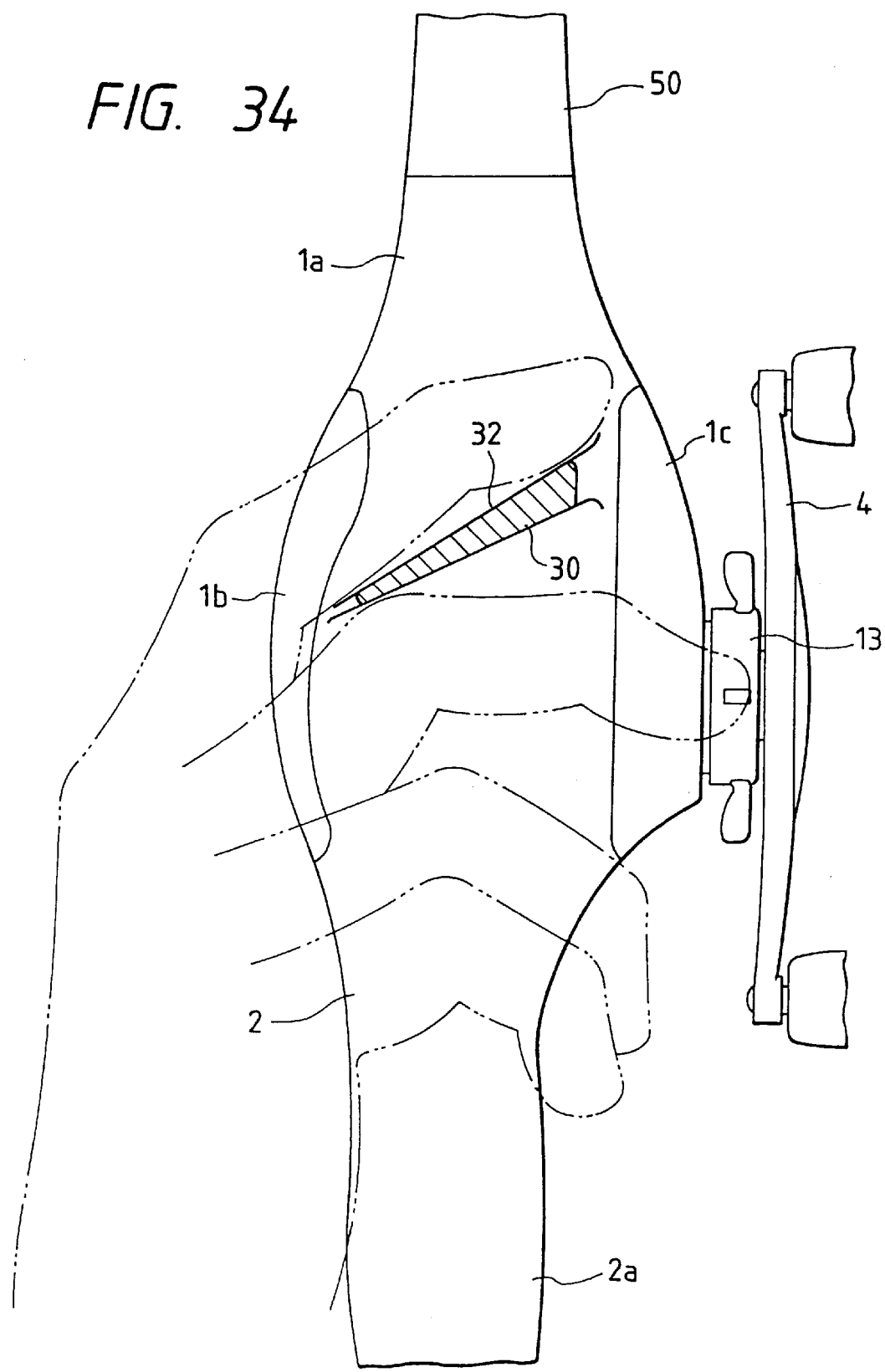
FIG. 34 is a bottom plan view of a portion in the proximity of a reel for fishing as a fourteenth embodiment of the invention illustrative of a state in which the reel has been mounted in a fishing rod.

FIG. 34 shows a fourteenth embodiment of the invention wherein the finger hooking surface 32 of the finger hooking portion 30 according to the sixth embodiment of the invention is substantially straight-shaped, whereby sense of stability and fitness is satisfactorily obtained when the portion of the index finger ranging from the distal phalanx to the middle phalanx is retained to ensure that the grip portion 2 is gripped positively.

Figure 35:
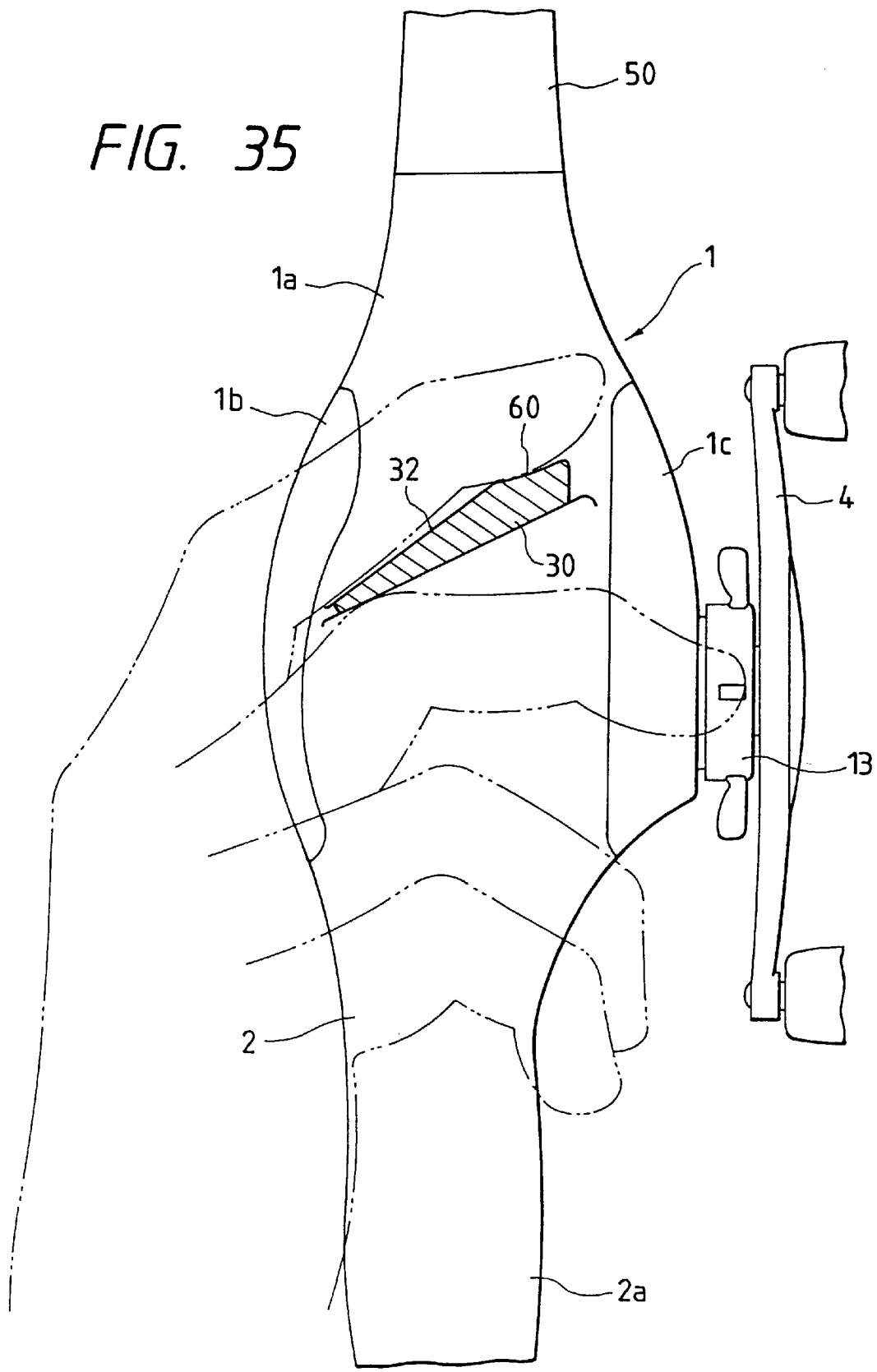
FIG. 35 is a bottom plan view of a portion in the proximity of a reel for fishing as a fifteenth embodiment of the invention illustrative of a state in which the reel has been mounted in a fishing rod.

FIG. 35 shows a fifteenth embodiment of the invention as a modified example of the fourteenth embodiment thereof, wherein there is formed a depression 60 with which the digital pulp portion of the index finger, that is, the eminence of the distal phalanx portion is brought into contact, the depression being formed in the leading end portion of the finger hooking surface 32 of the finger hooking portion 30. The formation of the depression 60 with which the digital pulp portion of the index finger is brought into contact results in increasing sense of stability and fitness to ensure that the grip portion 2 is gripped positively.

Such a depression may be formed any other embodiment of the invention.

FIG. 36 shows a sixteenth embodiment of the invention wherein the finger hooking surface 32 of the finger hooking portion 30 according to the sixth embodiment of the invention is formed into a recess gently depressed. According to this embodiment of the invention, sense of stability is obtained when the portion of the index finger ranging from the distal phalanx to the middle phalanx is retained to ensure that the grip portion 2 is gripped positively.

Although a description has been given of examples of the reels for fishing which are integral with the fishing rods that is, the fishing rods incorporating the respective reels for fishing in the preceding embodiments of the invention, the fishing rod provided with a reel fitting portion in its butt grip portion as proposed in Japanese Utility Model Laid-Open No. 82765/1989 in the prior art may be modified in that a grip portion is formed in such a reel fitting portion and that a finger hooking portion is provided on the undersurface of the grip portion as described above so as to improve the grip maintainability. In this case, the reel fitting portion is formed as a swelling (or bulge) one thicker than the fishing rod body, which is desirably used as the grip portion.

The present invention is limited to the above-described embodiments of the invention but may be modified in various manners without departing from the spirit and scope of the invention.

As set forth above, the reel body in the reel for fishing integral with the fishing rod is provided with the finger hooking portion in the grip area on the undersurface of the grip portion including the reel body, so that the grip portion is gripped positively with stability even though it is gripped lightly. Moreover, the fishing rod and the reel for fishing integral with a fishing rod are provided with the finger hooking portion on the undersurface of the grip portion along the index finger which grips the grip portion to ensure that the grip portion is gripped with stability. Therefore, it is possible to improve the operability when motion is applied to the fishing rod at the time terminal tackles are cast or arranged. As positive, stable hold maintainability is obtainable even though the grip portion is gripped lightly, the angler is set free from feeling tired in view of operating fishing tackles. Moreover, the provision of the wide ridge-like finger hooking portion along the finger in particular prevents force from locally centering on part of the finger regained by the finger hooking portion and hardly makes the angler feel tired even when the fishing operation is repeated for hours and besides makes the angler free from fingerache. Since the grip maintainability of the grip portion is thus stabilized, the casting operation and the fishline-winding operation tend to become facilitated in the case of a reel for fishing integral with a fishing rod, for example. Moreover, the operability of thumbing the spool is improved and any useless trouble become avoidable beforehand.

What is claimed is:

1. A reel for fishing comprising:
   a reel body having a spool on which a fishline is wound and a handle for driving the spool to rotate, the reel body having mounting means, provided at a leading end thereof in a fishing line play-out direction, for mounting a fishing rod thereon;
   a grip portion adapted to be gripped and held by a hand together with the reel body during fishing, the grip portion being provided on the reel body at a location substantially opposite from the mounting means with respect to the reel body;
   wherein an opening for permitting a thumbing operation to the spool by a thumb of the hand gripping and holding the grip portion and reel body is provided;
   wherein a cover member is movably supported on the reel body for receiving the thumb thereon and at least partially defining the opening when it is closed.

2. A reel for fishing as claimed in claim 1, wherein the cover member is pivotable with respect to the reel body.

3. A reel for fishing as claimed in claim 1, wherein the cover member is slidable with respect to the reel body in the fishing line playing-out direction.

4. A reel for fishing comprising:
   a reel body having a spool on which a fishline is wound and a handle for driving the spool to rotate, the reel body having mounting means, provided at a leading end thereof in a fishing line play-out direction, for mounting a fishing rod thereon;
   a grip portion adapted to be gripped and held by a hand together with the reel body during fishing, the grip portion being provided on the reel body at a location substantially opposite from the mounting means with respect to the reel body;
   wherein a finger hooking portion for retaining an index finger of the hand gripping and holding the grip portion and reel body is provided in a grip area on an undersurface of the reel body;
   wherein the finger hooking portion is ridge-shaped so as to protrude downward from the undersurface of the reel body and elongate laterally and wherein the index finger of the hand gripping and holding the grip portion and reel body ergonomically extends along and is retained by the finger hooking portion.

5. A reel for fishing as claimed in claim 4, wherein the finger hooking portion is ridge-shaped so as to protrude downward from the undersurface of the reel body and elongate laterally and wherein the index finger of the hand gripping and holding the grip portion and reel body ergonomically extends along and is retained by the finger hooking portion.

6. A reel for fishing as claimed in claim 4, wherein the lateral length of the finger hooking portion is more than an protrusion amount of the finger hooking portion from the undersurface.

7. A reel for fishing as claimed in claim 4, wherein the lateral length of the finger hooking portion is at least 1.5 cm.

8. A reel for fishing as claimed in claim 4, wherein the finger hooking portion laterally extends obliquely so that a lateral end of the finger hooking portion nearest to the handle is offset in the fishing line play-out direction relative to the other opposite lateral end of the finger hooking portion farthest away from the handle.

* * * * *